(12) United States Patent
Chen et al.

(10) Patent No.: US 12,705,204 B2
(45) Date of Patent: Aug. 11, 2026

(54) MODE SWITCHING CIRCUIT AND METHOD, EXPANSION CONNECTOR, AND PCIe CARD

(71) Applicant: Suzhou MetaBrain Intelligent Technology Co., Ltd., Suzhou (CN)

(72) Inventors: Sanxia Chen, Suzhou (CN); Tiejun Liu, Suzhou (CN); Jing Ji, Suzhou (CN); Peiqiang Dong, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/143,092

(22) PCT Filed: Sep. 29, 2024

(86) PCT No.: PCT/CN2024/122191
§ 371 (c)(1),
(2) Date: Jun. 25, 2025

(87) PCT Pub. No.: WO2025/139149
PCT Pub. Date: Jul. 3, 2025

(65) Prior Publication Data

US 2026/0133928 A1 May 14, 2026

(30) Foreign Application Priority Data

Dec. 27, 2023 (CN) ........................ 202311813726.2

(51) Int. Cl.
*G06F 13/20* (2006.01)
*G06F 13/42* (2006.01)

(52) U.S. Cl.
CPC .. *G06F 13/4282* (2013.01); *G06F 2213/0026* (2013.01)

(58) Field of Classification Search
None
See application file for complete search history.

(56) References Cited

U.S. PATENT DOCUMENTS 7,814,255 B1 10/2010 Deva et al.
2017/0235351 A1* 8/2017 Zhou ...................... G06F 1/263 713/300

(Continued)

FOREIGN PATENT DOCUMENTS

CN 107407943 A 11/2017
CN 112463697 A 3/2021

(Continued)

OTHER PUBLICATIONS

International Search Report of corresponding PCT application (PCT/CN2024/122191) Dec. 26, 2024, 7 pages.

(Continued)

*Primary Examiner* — Henry Tsai
*Assistant Examiner* — Dean Phan
(74) *Attorney, Agent, or Firm* — Cooper Legal Group, LLC

(57) ABSTRACT

A mode switching circuit is disclosed. An input terminal of a first switching circuit is configured to be connected to a first reverse differential pin of the connector, a first output terminal of the first switching circuit is configured to be connected to a first reset in-place terminal of a PCIe device, and a second output terminal of the first switching circuit is connected to a clock switching circuit; a first input terminal of a second switching circuit is configured to be connected to a second reset in-place terminal of the PCIe device, a second input terminal of the second switching circuit is connected to the clock switching circuit, and an output terminal of the second switching circuit is configured to be connected to a first front differential pin of the connector; and two sets of level shifting channels of a first bidirectional level shifter perform data transmission.

20 Claims, 9 Drawing Sheets

(56) References Cited

U.S. PATENT DOCUMENTS

| | | | | |
|---|---|---|---|---|
| 2019/0386665 | A1* | 12/2019 | Shalita | H03L 7/081 |
| 2022/0283978 | A1 | 9/2022 | Huang et al. | |
| 2023/0107127 | A1* | 4/2023 | Tsurumi | G06F 13/4221<br>710/314 |

FOREIGN PATENT DOCUMENTS

| | | | |
|---|---|---|---|
| CN | 113722259 | A | 11/2021 |
| CN | 114116565 | A | 3/2022 |
| CN | 115309683 | A | 11/2022 |
| CN | 115733549 | A | 3/2023 |
| CN | 116132009 | A | 5/2023 |
| CN | 117149691 | A | 12/2023 |
| CN | 117472837 | A | 1/2024 |

OTHER PUBLICATIONS

Written Opinion of International Searching Authority of corresponding PCT application (PCT/CN2024/122191) Dec. 26, 2024, 11 pages.

Notification to Grant Patent Right for Invention of corresponding CN priority application (CN202311813726.2) Feb. 4, 2024, 3 pages.

* cited by examiner

MODE SWITCHING CIRCUIT AND METHOD, EXPANSION CONNECTOR, AND PCIe CARD

CROSS-REFERENCE TO RELATED APPLICATION

This application claims priority to Chinese Patent Application No. 202311813726.2, filed on Dec. 27, 2023 in China National Intellectual Property Administration and entitled "Mode Switching Circuit and Method, Expansion Connector, and PCIe Card", which is hereby incorporated by reference in its entirety.

FIELD

The present application relates to the technical field of mode switching, and particularly to a mode switching circuit and method, an expansion connector, and a peripheral component interconnect express (PCIe) card.

BACKGROUND

A PCIe is a mainstream bus standard for servers, and more and more PCIe devices are gradually applied to various scenes.

A PCIe bus interface of the PCIe device may be used either as a root complex (RC) interface or as an endpoint (ED) interface. The PCIe bus interface needs to be able to switch between the RC interface mode and the ED interface mode. However, in the RC interface mode or the ED interface mode, function definitions of some low-speed signals in the PCIe bus interface are different, so it is difficult to realize switching.

In current switching schemes, two modes are generally defined in advance and may not be changed. If a change is required, reworking or replacing non-standard custom cables is required to achieve expansion. This switching method is inflexible, which increases labor costs and accessory costs.

SUMMARY

The present application provides a mode switching circuit and method, an expansion connector, and a PCIe card.

In one aspect, the present application provides a mode switching circuit, including: a first switching circuit, a second switching circuit, a clock switching circuit, and a first bidirectional level shifter;

an input terminal of the first switching circuit is configured to be connected to a first reverse differential pin of a connector, a first output terminal of the first switching circuit is configured to be connected to a first reset in-place terminal of a PCIe device, and a second output terminal of the first switching circuit is connected to the clock switching circuit; the first switching circuit is configured to transmit an RC reset signal and/or an RC in-place signal between the first reverse differential pin and the first reset in-place terminal, or send an ED differential clock signal transmitted by the first reverse differential pin to the clock switching circuit;

a first input terminal of the second switching circuit is configured to be connected to a second reset in-place terminal of the PCIe device, a second input terminal of the second switching circuit is connected to the clock switching circuit, and an output terminal of the second switching circuit is configured to be connected to a first front differential pin of the connector; the second switching circuit is configured to send an RC differential clock signal to the first front differential pin, or transmit an ED reset signal and/or an ED in-place signal between the first front differential pin and the second reset in-place terminal;

the clock switching circuit is configured to generate a reference clock signal sent to the PCIe device and the RC differential clock signal sent to the second switching circuit, or generate the reference clock signal sent to the PCIe device according to the ED differential clock signal; and a first set of level shifting channels of the first bidirectional level shifter is configured to transmit data between a second reverse differential pin of the connector and a first data terminal of the PCIe device, and a second set of level shifting channels of the first bidirectional level shifter is configured to transmit data between a second front differential pin of the connector and a second data terminal of the PCIe device; two sets of level shifting channels of the first bidirectional level shifter are capable of being configured to transmit an inter-integrated circuit (I2C) bus signal or to transmit a wake-up signal and/or an identification (ID) signal.

In some implementations, the mode switching circuit further includes: a first tri-state level shifting circuit;

a first side port of the first tri-state level shifting circuit is connected to the first output terminal of the first switching circuit, and a second side port of the first tri-state level shifting circuit is configured to be connected to the first reset in-place terminal of the PCIe device;

the first tri-state level shifting circuit is configured to: transmit the RC reset signal and/or the RC in-place signal in an RC interface mode; or a port of the first tri-state level shifting circuit is in a high-impedance state in an ED interface mode.

In some implementations, the first tri-state level shifting circuit includes a first tri-state level shifter; the first tri-state level shifter is configured to connect the first output terminal of the first switching circuit and the first reset in-place terminal of the PCIe device; and an enable terminal of the first tri-state level shifter is configured to be connected to an RC enable signal, and the RC enable signal is valid in the RC interface mode.

In some implementations, the first tri-state level shifting circuit further includes: a first level circuit; the first level circuit is connected to a power supply terminal of the first tri-state level shifter;

the first level circuit is configured to: provide a reference level to the first tri-state level shifter in the RC interface mode; or the first level circuit is configured to: stop supplying power in the ED interface mode.

In some implementations, the first level circuit includes: a first switching transistor;

an input terminal of the first switching transistor is connected to a power supply, and an output terminal of the first switching transistor is connected to the power supply terminal of the first tri-state level shifter; and a control terminal of the first switching transistor is connected to the RC enable signal; and in response to determining that the RC enable signal is valid, the first switching transistor is turned on.

In some implementations, in the first switching circuit, the input terminal and the second output terminal of the first switching circuit are directly connected through a first wire; and a pin of a side port of the first tri-state level shifting circuit is arranged with a first via, and the first wire passes through the first via and is electrically connected with the first via.

In some implementations, the mode switching circuitry further includes: a second tri-state level conversion circuit;

a first side port of the second tri-state level shifting circuit is connected to the first input terminal of the second switching circuit, and a second side port of the second tri-state level shifting circuit is configured to be connected to the second reset in-place terminal of the PCIe device;

a port of the second tri-state level shifting circuit is in a high-impedance state in an RC interface mode; and in an ED interface mode, the second tri-state level shifting circuit is configured to: transmit the ED reset signal and/or the ED in-place signal.

In some implementations, the second tri-state level shifting circuit includes a second tri-state level shifter; the second tri-state level shifter is configured to connect the first input terminal of the second switching circuit and the second reset in-place terminal of the PCIe device; and an enable terminal of the second tri-state level shifter is configured to be connected to an ED enable signal, and the ED enable signal is valid in the ED interface mode.

In some implementations, the second tri-state level shifting circuit further includes: a second level circuit; the second level circuit is connected to a power supply terminal of the second tri-state level shifter;

the second level circuit is configured to: stop supplying power in the RC interface mode; or the second level circuit is configured to: provide a reference level to the second tri-state level shifter in the ED interface mode.

In some implementations, the second level circuit includes: a second switching transistor;

an input terminal of the second switching transistor is connected to a power supply, and an output terminal of the second switching transistor is connected to the power supply terminal of the second tri-state level shifter; and a control terminal of the second switching transistor is connected to the ED enable signal; in response to determining that the ED enable signal is valid, the second switching transistor is turned on.

In some implementations, in the second switching circuit, the second input terminal and the output terminal of the second switching circuit are directly connected through a second wire; and a pin of a side port of the second tri-state level shifting circuit is arranged with a second via, and the second wire passes through the second via and is electrically connected with the second via.

In some implementations, the mode switching circuit further includes: a second bi-directional level shifter and a third tri-state level shifting circuit;

a first side port of the third tri-state level shifting circuit is connected to a third reverse differential pin of the connector, and a second side port of the third tri-state level shifting circuit is configured to be connected to a third reset in-place terminal of the PCIe device;

a first set of level shifting channels of the second bidirectional level shifter is configured to transmit data between a fourth reverse differential pin of the connector and a third data terminal of the PCIe device, and a second set of level shifting channels of the second bidirectional level shifter is configured to transmit data between a fourth front differential pin of the connector and a fourth data terminal of the PCIe device;

the third tri-state level shifting circuit is configured to transmit the RC reset signal and/or the RC in-place signal in an RC interface mode; the first set of level shifting channels of the second bidirectional level shifter is configured to transmit the I2C bus signal, and the second set of level shifting channels of the second bidirectional level shifter is configured to transmit the wake-up signal and/or the ID signal; and a port of the third tri-state level shifting circuit is in a high-impedance state in an ED interface mode; the first set of level shifting channels of the second bidirectional level shifter is configured to transmit the wake-up signal and/or the ID signal, and the second set of level shifting channels of the second bidirectional level shifter transmit the I2C bus signal.

In some implementations, the clock switching circuit includes: a clock generator and a clock buffer;

a first output terminal of the clock generator is connected to a first input terminal of the clock buffer and configured to output a local differential clock signal in an RC interface mode;

a second output terminal of the clock generator is connected to the second input terminal of the second switching circuit and configured to output the RC differential clock signal in the RC interface mode;

a second input terminal of the clock buffer is connected to the second output terminal of the first switching circuit and configured to receive the ED differential clock signal in an ED interface mode; and the clock buffer is configured to generate the reference clock signal sent to the PCIe device according to the local differential clock signal or the ED differential clock signal.

In some implementations, an enable terminal of the clock generator is configured to be connected to an RC enable signal; and in response to determining that the RC enable signal is valid in the RC interface mode and that the RC enable signal is valid, the clock generator outputs the local differential clock signal and the RC differential clock signal.

In some implementations, a selection terminal of the clock buffer is configured to be connected to a clock selection signal;

in response to determining that the clock selection signal represents the RC interface mode, the first input terminal of the clock buffer is valid; or in response to determining that the clock selection signal represents the ED interface mode, the second input terminal of the clock buffer is valid.

In some implementations, the mode switching circuit further includes: a mode selection circuit; and the mode selection circuit is configured to provide the PCIe device with a mode selection signal indicating that an RC interface mode is currently selected or an ED interface mode is currently selected.

In some implementations, the mode selection circuit includes: a selector switch, a first resistor, and a second resistor;

a first terminal of the first resistor is connected to a power supply, and a second terminal of the first resistor is sequentially connected to ground through the selector switch and the second resistor; or a first terminal of the selector switch is connected to the power supply, and a second terminal of the selector switch is sequentially connected to ground through the first resistor and the second resistor; and a terminal of the second resistor close to the first resistor is configured to be connected to the PCIe device to provide the mode selection signal.

In another aspect, the present application provides a mode switching method, which is implemented based on the above-mentioned mode switching circuit, and includes:

performing, in an RC interface mode, the following steps:

controlling a first switching circuit to transmit an RC reset signal and/or an RC in-place signal between a first reverse differential pin of a connector and a first reset in-place terminal of a PCIe device;

controlling a clock switching circuit to generate a reference clock signal sent to the PCIe device and an RC differential clock signal sent to a second switching circuit;

controlling the second switching circuit to send the RC differential clock signal to a first front differential pin of the connector; and controlling a first set of level shifting channels of a first bidirectional level shifter to transmit an I2C bus signal, and controlling a second set of level shifting channels of the first bidirectional level shifter to transmit a wake-up signal and/or an ID signal; or performing, in an ED interface mode, the following steps:

controlling the first switching circuit to send an ED differential clock signal transmitted by the first reverse differential pin of the connector to the clock switching circuit;

controlling the clock switching circuit to generate the reference clock signal sent to the PCIe device according to the ED differential clock signal;

controlling the second switching circuit to transmit an ED reset signal and/or an ED in-place signal between the first front differential pin of the connector and a second reset in-place terminal of the PCIe device; and controlling the first set of level shifting channels of the first bidirectional level shifter to transmit the wake-up signal and/or the ID signal, and controlling the second set of level shifting channels of the first bidirectional level shifter to transmit the I2C bus signal.

In yet another aspect, the present application provides an expansion connector, including a connector and the above-mentioned mode switching circuit.

In yet another aspect, the present application provides a PCIe card, including: a PCIe device and at least one above-mentioned expansion connector; and the PCIe device is provided with RC firmware and ED firmware; the PCIe device loads the RC firmware in an RC interface mode; or the PCIe device loads the ED firmware in an ED interface mode.

In some implementations, the expansion connector includes a mode selection circuit, and the PCIe device is configured to: load RC firmware in response to an RC mode instruction triggered based on the mode selection circuit; and load ED firmware in response to an ED mode instruction triggered based on the mode selection circuit.

BRIEF DESCRIPTION OF THE DRAWINGS

To more clearly illustrate the technical solutions in the implementations of the present application or in the related art, the drawings required in the descriptions of the implementations or the related art will be briefly introduced below. Obviously, the drawings described below are only some implementations of the present application, and a person skilled in the art may obtain other drawings according to these drawings without involving any inventive effort.

DESCRIPTION OF REFERENCE NUMERALS

Figure 1:
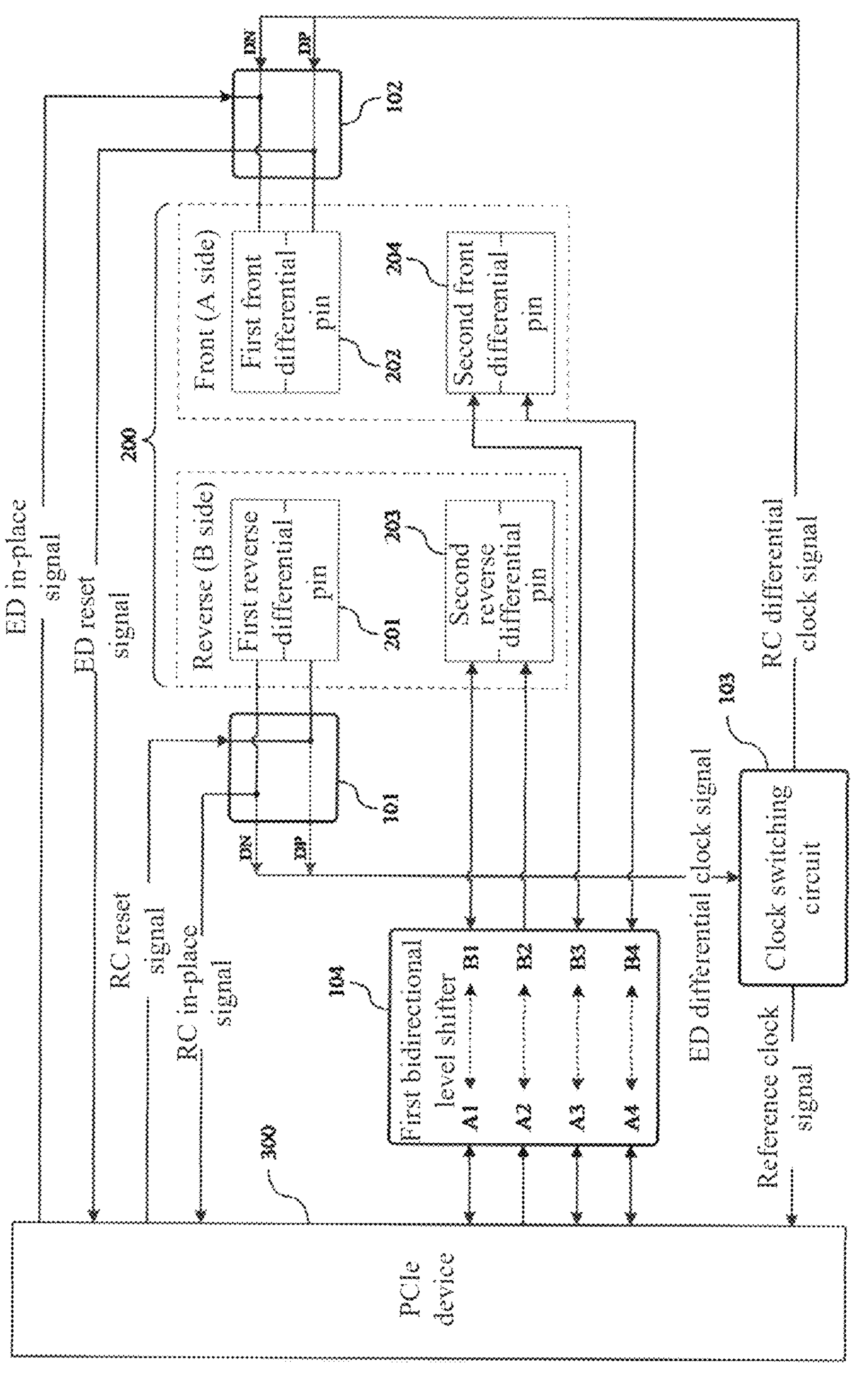
FIG. 1 is a first schematic structural diagram of a mode switching circuit according to some embodiments of the present application.

101—first switching circuit; 102—second switching circuit; 103—clock switching circuit; 1031—clock generator; 1032—clock buffer; 104—first bidirectional level shifter; 105—first tri-state level shifting circuit; 1051—first tri-state level shifter; 1052—first level circuit; M1—first switching transistor; 106—second tri-state level shifting circuit; 1061—second tri-state level shifter; 1062—second level circuit; M2—second switching transistor; 107—second bidirectional level shifter; 108—third tri-state level shifting circuit; 109—mode selection circuit; SW1—selector switch; R1—first resistor; R2—second resistor; 1011—first wire; 1021—second wire; 200—connector; 201—first reverse differential pin; 202—first front differential pin; 203—second reverse differential pin; 204—second front differential pin; 205—third reverse differential pin; 206—third front differential pin; 207—fourth reverse differential pin; 208—fourth front differential pin; and 300—PCIe device.

DETAILED DESCRIPTION

To make the object, technical solutions, and advantages of the embodiments the present application clearer, the technical solutions in the embodiments of the present application will be clearly and completely described below in conjunction with the accompanying drawings in the embodiments of the present application. Obviously, the described embodiments are only some embodiments of the present application, not all embodiments. All other embodiments obtained by a person skilled in the art based on the embodiments in the present application without inventive efforts fall within the scope of the present application.

With the vigorous development of 5th generation mobile communication technology (5G) networks, cloud computing, and big data, PCIe, as a mainstream bus standard for servers, is gradually being upgraded and has begun to be applied in the high-end market. With the implementation of PCIe application interfaces, interconnected high-speed cables of PCIe bus within the server may support SlimSAS (thin SAS, SAS is Serial Attached SCSI, SCSI is Internet Small Computer System Interface) cable assemblies and may also support higher-rate mini cool edge input/output (MCIO) cable assemblies. A SlimSAS connector and a MCIO connector each are a cable assembly connector interface designed for the PCIe. This interface is a board-to-wire connector interface.

In order to support a PCIe high-speed interface, most of the latest PCIe high-speed interconnection interfaces within the servers are implemented by the MCIO high-speed connector interface. The MCIO connector is a high-speed and high-density board-to-wire connector that supports the PCIe interface. Its product is small in size, reliable and stable in connection, has multiple interface specifications, and supports high-speed interfaces with differential pairs of X4, X8, X16, and the like. External cables are divided into left outlet, right outlet, vertical outlet, 90-degree outlet, and the like to meet the flexible application inside a chassis.

To design more compact interfaces and flexibly use PCIe bus interfaces of different specifications within the new generation of servers, in most of the servers, PCIe bus interfaces are designed into a plurality of PCIe bus interfaces of MCIO X8 specifications. The PCIe bus interface may be used as a PCIe X8 bus alone or split into two PCIe X4 buses, and the PCIe bus interfaces may further be combined as a bus interface of a PCIe X16 specification.

The MCIO connector has defined a position of a high-speed differential bus and a position of a low-speed auxiliary signal line according to the protocol. However, the function definition and position of the low-speed auxiliary signal are not uniform, and the signal definitions are different. As a result, when the PCIe bus interface expanded through a connector works in an RC interface mode or an ED interface mode, the function definitions of some low-speed signals are different, and it is difficult for the PCIe bus interface to achieve the same interface definition in different modes.

Most of the cable assemblies are connected by cross wires. FIG. 1 is a schematic diagram of a cross-wire connection mode. As shown in FIG. 1, the connector is divided into an A side (front) and a B side (reverse). An A side of a connector P1 is sequentially connected to a B side of another connector P2, and a B side of the connector P1 is sequentially connected to an A side of another connector P2, thereby showing the form of cross-connection of the A side and the B side. This connection mode is referred to as a cross-wire connection mode.

In this connection mode, the connector on one side is a PCIe bus interface operating in the RC interface mode and is configured to be connected to an RC master device (also referred to as an RC host), such as a server host. The connector on the other side is a PCIe bus interface operating in the ED interface mode and is configured to be connected to an ED slave device (also referred to as an ED slave machine), such as a non-volatile memory express (NVMe) hard disk and an expansion network card. Therefore, the RC interface mode may also be referred to as a master mode, and the ED interface mode may also be referred to as a slave mode.

Taking the MCIO X8 connector as an example, when the connector is used as an RC interface, pin definitions of its A and B sides may be shown in Table 1 below. When the connector is used as an ED interface, pin definitions of its A and B sides may be shown in Table 2 below. For example, if the connector P1 shown in FIG. 1 is an RC interface and the connector P2 is an ED interface, the pin definition of the connector P1 is shown in Table 1, and the pin definition of the connector P2 is shown in Table 2.

TABLE 1

| Pin number | Differential pair | Description |
|---|---|---|
| A1 | | GND |
| A2 | 1 | PCIe_RX_DP0 |
| A3 | 1 | PCIe_RX_DN0 |
| A4 | | GND |
| A5 | 2 | PCIe_RX_DP1 |
| A6 | 2 | PCIe_RX_DN1 |
| A7 | | GND |
| A8 | 3 | MCIO_ID0 |
| A9 | 3 | PCIe_WAKE0 |
| A10 | | GND |
| A11 | 4 | PCIe_CLK_DP0 |
| A12 | 4 | PCIe_CLK_DN0 |
| A13 | | GND |
| A14 | 5 | PCIe_RX_DP2 |
| A15 | 5 | PCIe_RX_DN2 |
| A16 | | GND |
| A17 | 6 | PCIe_RX_DP3 |
| A18 | 6 | PCIe_RX_DN3 |
| A19 | | GND |
| A20 | 7 | PCIe_RX_DP4 |
| A21 | 7 | PCIe_RX_DN4 |
| A22 | | GND |
| A23 | 8 | PCIe_RX_DP5 |
| A24 | 8 | PCIe_RX_DN5 |
| A25 | | GND |
| A26 | 9 | MCIO_ID1 |
| A27 | 9 | PCIe_WAKE1 |
| A28 | | GND |
| A29 | 10 | PCIe_CLK_DP1 |
| A30 | 10 | PCIe_CLK_DN1 |
| A31 | | GND |
| A32 | 11 | PCIe_RX_DP6 |
| A33 | 11 | PCIe_RX_DN6 |
| A34 | | GND |
| A35 | 12 | PCIe_RX_DP7 |
| A36 | 12 | PCIe_RX_DN7 |
| A37 | | GND |
| B1 | | GND |
| B2 | 1 | PCIe_TX_DP0 |
| B3 | 1 | PCIe_TX_DN0 |
| B4 | | GND |
| B5 | 2 | PCIe_TX_DP1 |
| B6 | 2 | PCIe_TX_DN1 |
| B7 | | GND |
| B8 | 3 | MCIO_SCL0 |
| B9 | 3 | MCIO_SDA0 |
| B10 | | GND |
| B11 | 4 | PCIe_RESET0 |
| B12 | 4 | PCIe_PRSNT0 |
| B13 | | GND |
| B14 | 5 | PCIe_TX_DP2 |
| B15 | 5 | PCIe_TX_DN2 |
| B16 | | GND |
| B17 | 6 | PCIe_TX_DP3 |
| B18 | 6 | PCIe_TX_DN3 |
| B19 | | GND |
| B20 | 7 | PCIe_TX_DP4 |

TABLE 1-continued

| Pin number | Differential pair | Description |
|---|---|---|
| B21 | 7 | PCIe_TX_DN4 |
| B22 | | GND |
| B23 | 8 | PCIe_TX_DP5 |
| B24 | 8 | PCIe_TX_DN5 |
| B25 | | GND |
| B26 | 9 | MCIO_SCL1 |
| B27 | 9 | MCIO_SDA1 |
| B28 | | GND |
| B29 | 10 | PCIe_RESET1 |
| B30 | 10 | PCIe_PRSNT1 |
| B31 | | GND |
| B32 | 11 | PCIe_TX_DP6 |
| B33 | 11 | PCIe_TX_DN6 |
| B34 | | GND |
| B35 | 12 | PCIe_TX_DP7 |
| B36 | 12 | PCIe_TX_DN7 |
| B37 | | GND |

TABLE 2

| Pin number | Differential pair | Description |
|---|---|---|
| A1 | | GND |
| A2 | 1 | PCIe_RX_DP0 |
| A3 | 1 | PCIe_RX_DN0 |
| A4 | | GND |
| A5 | 2 | PCIe_RX_DP1 |
| A6 | 2 | PCIe_RX_DN1 |
| A7 | | GND |
| A8 | 3 | MCIO_SCL0 |
| A9 | 3 | MCIO_SDA0 |
| A10 | | GND |
| A11 | 4 | PCIe_RES_ET0 |
| A12 | 4 | PCIe_PRS_NT0 |
| A13 | | GND |
| A14 | 5 | PCIe_RX_DP2 |
| A15 | 5 | PCIe_RX_DN2 |
| A16 | | GND |
| A17 | 6 | PCIe_RX_DP3 |
| A18 | 6 | PCIe_RX_DN3 |
| A19 | | GND |
| A20 | 7 | PCIe_RX_DP4 |
| A21 | 7 | PCIe_RX_DN4 |
| A22 | | GND |
| A23 | 8 | PCIe_RX_DP5 |
| A24 | 8 | PCIe_RX_DN5 |
| A25 | | GND |
| A26 | 9 | MCIO_SCL1 |
| A27 | 9 | MCIO_SDA1 |
| A28 | | GND |
| A29 | 10 | PCIe_RESET1 |
| A30 | 10 | PCIe_PRSNT1 |
| A31 | | GND |
| A32 | 11 | PCIe_RX_DP6 |
| A33 | 11 | PCIe_RX_DN6 |
| A34 | | GND |
| A35 | 12 | PCIe_RX_DP7 |
| A36 | 12 | PCIe_RX_DN7 |
| A37 | | GND |
| B1 | | GND |
| B2 | 1 | PCIe_TX_DP0 |
| B3 | 1 | PCIe_TX_DN0 |
| B4 | | GND |
| B5 | 2 | PCIe_TX_DP1 |
| B6 | 2 | PCIe_TX_DN1 |
| B7 | | GND |
| B8 | 3 | MCIO_ID0 |
| B9 | 3 | PCIe_WAKE0 |
| B10 | | GND |
| B11 | 4 | PCIe_CLK_DP0 |
| B12 | 4 | PCIe_CLK_DN0 |
| B13 | | GND |
| B14 | 5 | PCIe_TX_DP2 |

TABLE 2-continued

| Pin number | Differential pair | Description |
|---|---|---|
| B15 | 5 | PCIe_TX_DN2 |
| B16 | | GND |
| B17 | 6 | PCIe_TX_DP3 |
| B18 | 6 | PCIe_TX_DN3 |
| B19 | | GND |
| B20 | 7 | PCIe_TX_DP4 |
| B21 | 7 | PCIe_TX_DN4 |
| B22 | | GND |
| B23 | 8 | PCIe_TX_DP5 |
| B24 | 8 | PCIe_TX_DN5 |
| B25 | | GND |
| B26 | 9 | MCIO_ID1 |
| B27 | 9 | PCIe_WAKE1 |
| B28 | | GND |
| B29 | 10 | PCIe_CLK_DP1 |
| B30 | 10 | PCIe_CLK_DN1 |
| B31 | | GND |
| B32 | 11 | PCIe_TX_DP6 |
| B33 | 11 | PCIe_TX_DN6 |
| B34 | | GND |
| B35 | 12 | PCIe_TX_DP7 |
| B36 | 12 | PCIe_TX_DN7 |
| B37 | | GND |

As shown in Table 1 and Table 2 above, the MCIO X8 connector has defined 8 pairs of high-speed differential signals according to the protocol, including receiving signals (PCIe_RX_DP/DN[0:7]) and sending signals (PCIe_TX_DP/DN[0:7]). For input and output high-speed differential data lines on two sides of the cable, since the differential line connection is adopted, the input and output definitions of the high-speed differential data lines of interfaces of the connectors on two sides (or a device with connectors on two sides) are consistent, the definitions of the A sides of the two interfaces of the connector P1 and the connector P2 are all RX data receiving, and the B sides are TX data sending.

In addition, a low-speed signal area of the MCIO connector defines multiple low-speed auxiliary signals. These low-speed auxiliary signals include the following signals.

(1) PCIe_RESET*: reset signal. The RC master device may output a reset signal for resetting an enabled ED slave device. There are two sets of the signals on each X8 connector to support two external X4-mode ED slave devices. In the X8 mode, PCIe_RESET0 is valid, and PCIe_RESET1 is invalid.

(2) PCIe_PRSNT*: in-place signal of ED slave device. The RC master reads this signal to confirm if the ED slave is in place, and the signal is pulled low to indicate that the ED slave is in place.

(3) PCIe_CLK_DN/DP*: differential clock signal of PCIe bus, generally 100 MHz. In some embodiments, the RC master device outputs the differential clock signal to the ED slave device to provide a clock signal of the same source to the ED slave device. Thus, the signal definitions, and input and output directions on the RC master device and the ED slave device are different.

(4) MCIO_SDA/SCL*: I2C (Inter-Integrated Circuit) bus signal, serial data line (SDA), and serial clock line (SCL). The I2C bus is a bidirectional two-wire synchronous serial bus that operates in a master-slave mode bus mechanism. One host is allowed at the same time. Therefore, in the RC mode and the ED mode, pin definitions of the master-slave mode are also different. Generally, the RC interface is used as the master device, and the ED interface is used as the slave device.

(5) PCIe_WAKE*: wake-up signal. When the PCIe device enters a dormant state and the main power supply has stopped supplying power, the PCIe device uses the signal to submit a wake-up request to a processor system, whereby the processor system may re-provide the main power supply Vcc to the PCIe device.

(6) MCIO_ID*: the RC master device reads the ID signal of the ED slave device to determine whether an opposite-terminal device is an X8-mode device or an X4-mode device. MCIO_IO[1:0]=00 indicates that the ED slave device includes two X4-mode devices, and MCIO_IO [1:0]=10 indicates that the ED slave device is an X4-mode device or an X8-mode device. Meanwhile, the in-place signal (PCIe_PRSNT) needs to be cooperated to determine the port application of the ED slave device, so as to configure the PCIe bus port mode.

As shown in Table 1 and Table 2 above, in different master-slave modes, the definitions of the low-speed auxiliary signals such as the reference clock signal (PCIe_CLK_DP/DN), the reset signal (PCIe_RESET), the in-place signal (PCIe_PRSNT), and the I2C bus signal (MCIO_SDA/SCL) of the PCIe bus interface are different, and the interface definitions may not be unified. In some embodiments, the MCIO connector of the RC master device provides the reference clock signal, the reset signal, the I2C bus signal, and the like to the outside, while the ED slave device is a receiving terminal to receive these low-speed auxiliary signals.

The embodiments of the present application provide a mode switching circuit, whereby switching of a connector between an RC interface and an ED interface may be realized by a simple electronic device, and a device or a cable does not need to be replaced when an interface mode is changed. Thus, when the connector is used as the PCIe device to expand the interface, the interface flexibility and versatility is greatly increased, and the switching is simple.

In some embodiments, a mode switching circuit is provided. As shown in FIG. 1, the mode switching circuit may expand functions of a connector 200, whereby when a PCIe device 300 is expanded based on the connector 200, the mode switching circuit is used as a peripheral circuit of the PCIe device 300. Thus, the connector 200 may be flexibly switched between an RC interface mode and an ED interface mode. The connector 200 may be a SlimSAS connector or an MCIO connector.

The mode switching circuit mainly expands functions of pins corresponding to a low-speed auxiliary signal in the connector 200, and these pins may include: a first reverse differential pin 201, a first front differential pin 202, a second reverse differential pin 203, a second front differential pin 204, and the like. It will be understood that a differential pin has two pins, that is, the first reverse differential pin 201 and the like each include two pins.

One of the first reverse differential pin 201 and the first front differential pin 202 is configured to transmit a differential clock signal (for example, PCIe_CLK_DN/DP), and the other is configured to transmit a reset signal (for example, PCIe_RESET) and/or an in-place signal (for example, PCIe_PRSNT). For example, the first reverse differential pin 201 may be pins B11 and B12 in Table 1 or Table 2, and the first front differential pin 202 may be pins A11 and A12 in Table 1 or Table 2. One of the second reverse differential pin 203 and the second front differential pin 204 is configured to transmit an I2C bus signal (for example, MCIO_SDA/SCL), and the other is configured to transmit a wake-up signal (for example, PCIe_WAKE) and/or an ID signal (for example, MCIO_ID). For example, the second reverse differential pin 203 may be pins B8 and B9 in Table 1 or Table 2, and the second front differential pin 204 may be pins A8 and A9 in Table 1 or Table 2.

As shown in FIG. 1, the mode switching circuit includes: a first switching circuit 101, a second switching circuit 102, a clock switching circuit 103, and a first bidirectional level shifter 104.

An input terminal of the first switching circuit 101 is configured to be connected to the first reverse differential pin 201 of the connector 200, a first output terminal of the first switching circuit 101 is configured to be connected to a first reset in-place terminal of a PCIe device 300, and a second output terminal of the first switching circuit 101 is connected to the clock switching circuit 103 to provide a corresponding differential clock signal, i.e., an ED differential clock signal, to the clock switching circuit 103. In some embodiments, the first switching circuit 101 is configured to transmit an RC reset signal and/or an RC in-place signal between the first reverse differential pin 201 and a first reset in-place terminal, or send the ED differential clock signal transmitted by the first reverse differential pin 201 to the clock switching circuit 103. The first reset in-place terminal of the PCIe device 300 is configured to transmit the RC reset signal and the RC in-place signal. It will be understood that the first reset in-place terminal includes two ports, i.e., a first reset terminal and a first in-place terminal. The first reset terminal is configured to send the RC reset signal, and the first in-place terminal configured to receive the RC in-place signal.

A first input terminal of the second switching circuit 102 is configured to be connected to a second reset in-place terminal of the PCIe device 300, and a second input terminal of the second switching circuit 102 is connected to the clock switching circuit 103 to acquire an RC differential clock signal generated by the clock switching circuit 103. An output terminal of the second switching circuit 102 is configured to be connected to the first front differential pin 202 of the connector 200. In some embodiments, the second switching circuit 102 is configured to send the RC differential clock signal to the first front differential pin 202, or transmit an ED reset signal and/or an ED in-place signal between the first front differential pin 202 and the second reset in-place terminal. The second reset in-place terminal of the PCIe device 300 is configured to transmit the ED reset signal and the ED in-place signal. It will be understood that the second reset in-place terminal includes two ports, i.e., a second reset terminal and a second in-place terminal. The second reset terminal is configured to receive the ED reset signal, and the second in-place terminal is configured to send the ED in-place signal.

A first set of level shifting channels of the first bidirectional level shifter 104 is configured to transmit data between the second reverse differential pin 203 of the connector 200 and a first data terminal of the PCIe device 300, and a second set of level shifting channels of the first bidirectional level shifter 104 is configured to transmit data between the second front differential pin 204 of the connector 200 and a second data terminal of the PCIe device 300. Since the second reverse differential pin 203 and the second front differential pin 204 each include two pins, each set of level shifting channels of the first bidirectional level shifter 104 includes at least two level shifting channels. Accordingly, the first bidirectional level shifter 104 includes at least four level shifting channels. As shown in FIG. 1, the first and second level shifting channels (corresponding to A1-B1, A2-B2) of the first bidirectional level shifter 104 are connected to the second reverse differential pin 203, and the third and fourth level shifting channels (corresponding to A3-B3, A4-B4) are connected to the second front differential pin 204.

The first data terminal and the second data terminal of the PCIe device 300 are configured to perform data transmission with the connector 200. One of the first data terminal and the second data terminal is configured to transmit the I2C bus signal, and the other is configured to transmit the wake-up signal and/or the ID signal. Further, two sets of level shifting channels of the first bidirectional level shifter 104 are capable of being configured to transmit the I2C bus signal or to transmit the wake-up signal and/or the ID signal.

The first bidirectional level shifter 104 may realize bidirectional level shifting, that is, an A side thereof is an input terminal and a B side thereof is an output terminal, or the B side thereof is the input terminal and the A side thereof is the output terminal. In these two cases, level shifting may be realized. That is, the first bidirectional level shifter 104 may realize bidirectional data transmission between the connector 200 and the PCIe device 300, and its level shifting channel may transmit not only the I2C bus signal, but also the wake-up signal and/or the ID signal.

The clock switching circuit 103 may determine whether to actively generate a differential clock signal in different modes. The clock switching circuit 103 is configured to generate a reference clock signal sent to the PCIe device 300 and the RC differential clock signal sent to the second switching circuit 102, or generate the reference clock signal sent to the PCIe device 300 according to the ED differential clock signal. In different modes, the clock switching circuit 103 implements different functions. In the RC interface mode, as the RC master device, it is necessary to provide a differential clock signal to the outside. Therefore, it is necessary to actively generate the differential clock signal, i.e., the RC differential clock signal.

An operating principle of this mode switching circuit is as follows.

Figure 2:
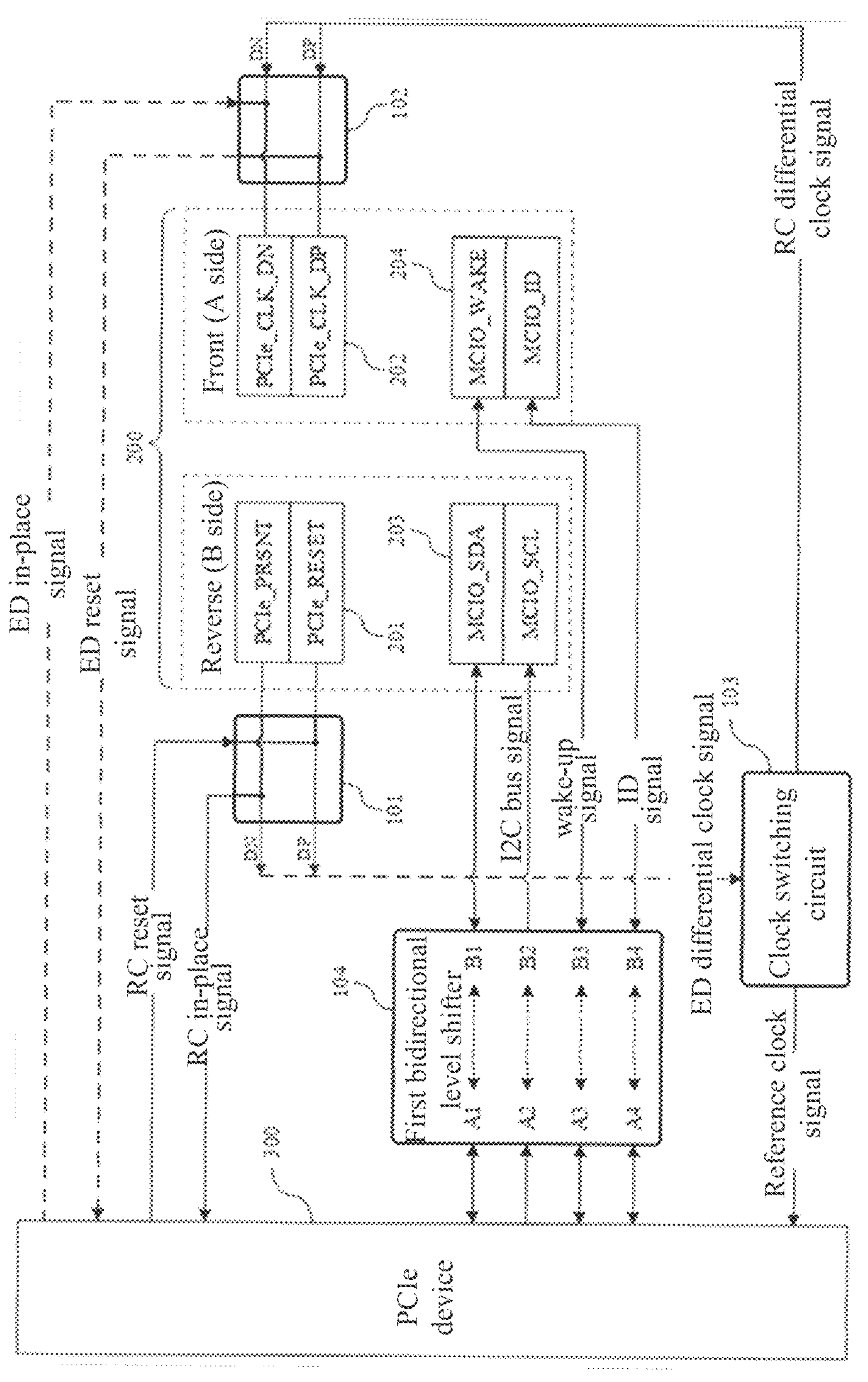
FIG. 2 is a schematic structural diagram of a mode switching circuit in an RC interface mode according to some embodiments of the present application.

FIG. 2 shows a pin function definition of the connector 200 in the RC interface mode, which is consistent with Table 1 above. As shown in FIG. 2, in the RC interface mode, the first reset in-place terminal of the PCIe device 300 may transmit a corresponding reset signal and in-place signal, i.e., the RC reset signal and the RC in-place signal. The first switching circuit 101 is configured to transmit the RC reset signal and/or the RC in-place signal between the first reverse differential pin 201 and the first reset in-place terminal, whereby based on the first reverse differential pin 201, the RC reset signal may be sent to an opposite terminal, or the RC in-place signal sent by the opposite terminal may be received. In this case, a local device is the RC master device, and the opposite terminal is generally the ED slave device.

In addition, the mode switching circuit needs to provide a differential clock signal, i.e., an RC differential clock signal, to the opposite terminal. In some embodiments, the clock switching circuit 103 is configured to generate a reference clock signal sent to the PCIe device 300 and the RC differential clock signal sent to the second switching circuit 102. The second switching circuit 102 is configured to send the RC differential clock signal to the first front differential pin 202, whereby the RC differential clock signal may be provided to the opposite terminal connected to the connector 200. The reference clock signal is a clock signal required for the operation of the PCIe device 300. For example, in response to determining that the PCIe device 300 is a field programmable gate array (FPGA), two reference clock signals of the same source may be provided to the PCIe device 300.

In the RC interface mode, the first set of level shifting channels of the first bidirectional level shifter 104 is configured to transmit the I2C bus signal, and the second set of level shifting channels of the first bidirectional level shifter 104 is configured to transmit the wake-up signal and/or the ID signal.

As shown in FIG. 2, in the RC interface mode, the first reverse differential pin 201 is configured to transmit an RC reset signal (PCIe_RESET) and an RC in-place signal (PCIe_PRSNT), the first front differential pin 202 is configured to transmit an RC differential clock signal (PCIe_CLK_DP/DN), the second reverse differential pin 203 is configured to transmit an I2C bus signal (MCIO_SDA/SCL), and the second front differential pin 204 is configured to transmit a wake-up signal (MCIO_WAKE) and an ID signal (MCIO_ID).

Figure 3:
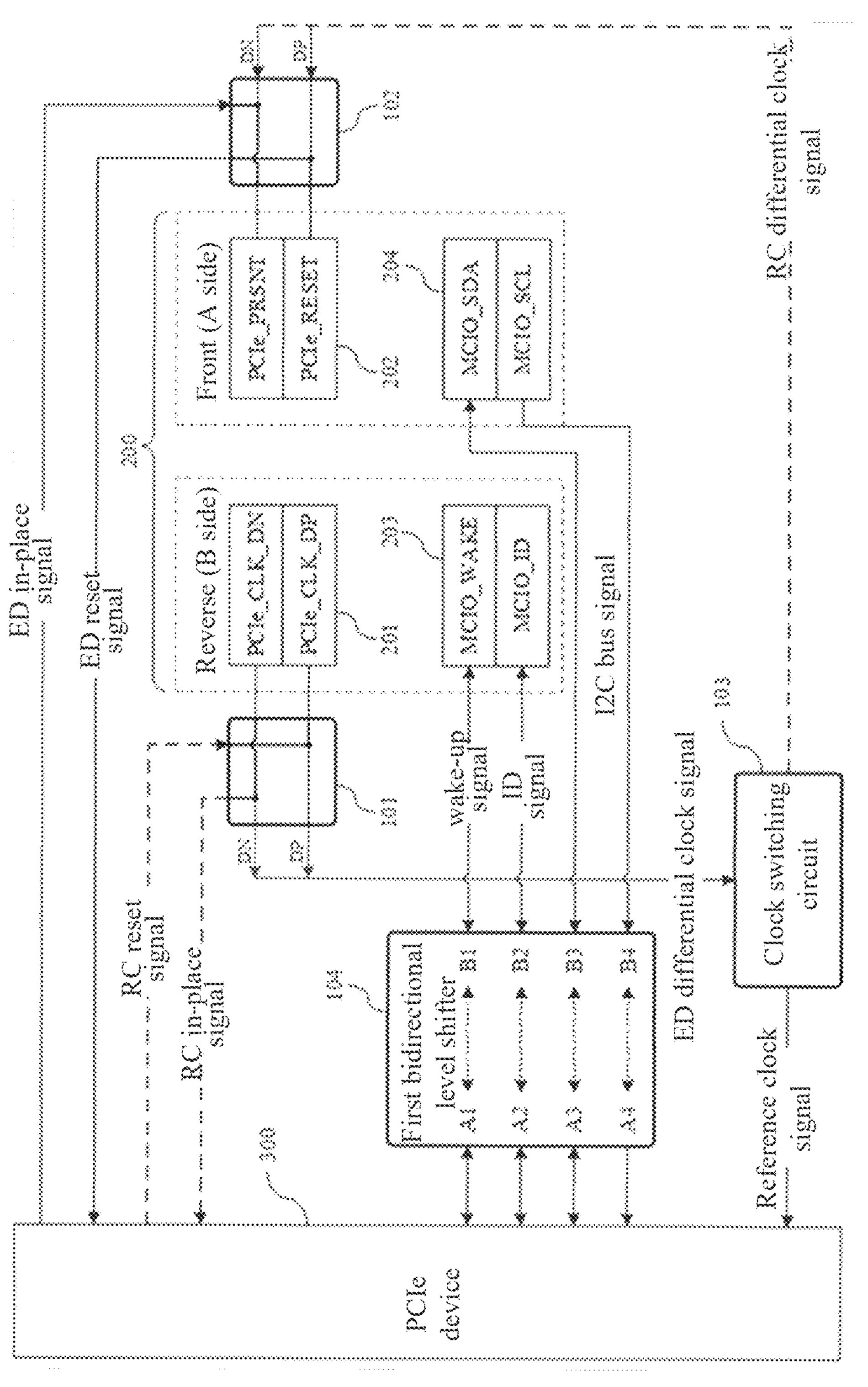
FIG. 3 is a schematic structural diagram of a mode switching circuit in an ED interface mode according to some embodiments of the present application.

FIG. 3 shows a pin function definition of the connector 200 in the ED interface mode, which is consistent with Table 2 above. As shown in FIG. 3, in the ED interface mode, a differential clock signal, i.e., an ED differential clock signal, needs to be provided by the opposite terminal. In some embodiments, the first switching circuit 101 is configured to send the ED differential clock signal transmitted by the first reverse differential pin 201 to the clock switching circuit 103, and the clock switching circuit 103 is configured to generate a reference clock signal sent to the PCIe device 300 according to the ED differential clock signal.

The second reset in-place terminal of the PCIe device 300 may transmit a corresponding reset signal and in-place signal, i.e., the ED reset signal and the ED in-place signal. The second switching circuit 102 is configured to transmit the ED reset signal and/or the ED in-place signal between the first front differential pin 202 and the second reset in-place terminal, whereby based on the first front differential pin 202, the ED reset signal may be sent to an opposite terminal, or the ED in-place signal sent by the opposite terminal may be received. In this case, a local device is the ED slave device, and the opposite terminal is generally the RC master device.

In the ED interface mode, the first set of level shifting channels of the first bidirectional level shifter 104 is configured to transmit the wake-up signal and/or the ID signal, and the second set of level shifting channels of the first bidirectional level shifter 104 is configured to transmit the I2C bus signal. That is, in the RC interface mode or the ED interface mode, the functions of the two sets of level shifting channels of the first bidirectional level shifter 104 are opposite.

As shown in FIG. 3, in the ED interface mode, the first reverse differential pin 201 is configured to transmit an ED differential clock signal (PCIe_CLK_DP/DN), the first front differential pin 202 is configured to transmit an ED reset signal (PCIe_RESET) and an ED in-place signal (PCIe_PRSNT), the second reverse differential pin 203 is configured to transmit a wake-up signal (MCIO_WAKE) and an ID signal (MCIO_ID), and the second front differential pin 204 is configured to transmit an I2C bus signal (MCIO_SDA/SCL).

In some embodiments, since each level shifting channel in the first bidirectional level shifter 104 may realize bidirectional data transmission, any set of level shifting channels in the first bidirectional level shifter 104 may transmit the I2C bus signal or transmit the wake-up signal and/or the ID signal. The PCIe device 300 may determine the functions of the first data terminal and the second data terminal by itself. In some embodiments, in the RC interface mode, the PCIe device 300 sets its first data terminal to transmit the I2C bus signal and sets its second data terminal to transmit the wake-up signal and/or the ID signal. In the ED interface mode, the PCIe device 300 sets its first data terminal to transmit the wake-up signal and/or the ID signal and sets its second data terminal to transmit the I2C bus signal.

According to the mode switching circuit provided by some embodiments, switching of the connector 200 between the RC interface and the ED interface may be realized by a simple electronic device, and a device or a cable does not need to be replaced when the interface mode is changed. Thus, when the connector 200 is used as the PCIe device to expand the interface, the interface flexibility and versatility is greatly increased, and the switching is simple. In addition, the PCIe device may be used as the master device to connect to an external device or may be used as the slave device to connect to a server host, whereby flexible switching in different application scenes is realized, thereby reducing labor costs and external accessory costs, and greatly increasing the product competitiveness.

In some implementations, the first switching circuit 101 is configured to realize switching between the differential clock signal and the reset in-place signal. For example, the first switching circuit 101 may be a multiplexer (MUX) or the like to connect the input terminal and the first output terminal or connect the input terminal and the second output terminal of the first switching circuit 101 to realize the signal switching. However, this switching method is complicated to implement. In some embodiments, the mode switching circuit is further provided with a tri-state level shifting circuit, i.e., a first tri-state level shifting circuit 105, which has a high-impedance state in addition to outputting a high level and a low level, and realizes signal switching using the characteristic that the high-impedance state does not affect the signal.

Figure 4:
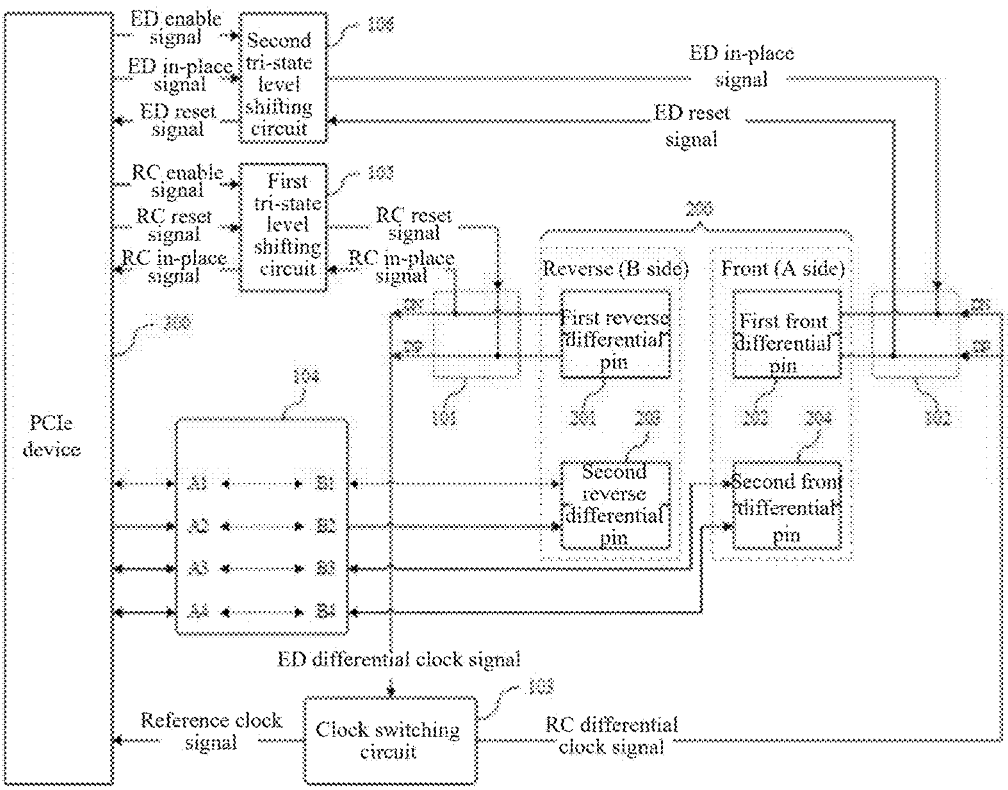
FIG. 4 is a second schematic structural diagram of a mode switching circuit according to some embodiments of the present application.

In some embodiments, as shown in FIG. 4, the mode switching circuit further includes: a first tri-state level shifting circuit 105. One side port (for example, a right side port in FIG. 4) of the first tri-state level shifting circuit 105 is connected to the first output terminal of the first switching circuit 101, and the other side port (for example, a left side port in FIG. 4) of the first tri-state level shifting circuit 105 is configured to be connected to the first reset in-place terminal of the PCIe device 300. In the RC interface mode, the first tri-state level shifting circuit 105 is configured to transmit an RC reset signal and/or an RC in-place signal. In the ED interface mode, a port of the first tri-state level shifting circuit 105 is in a high-impedance state. In this case, input and output terminals of the first switching circuit 101 may be directly turned on, that is, the input terminal and the first output terminal of the first switching circuit 101 are connected, and the input terminal and the second output terminal of the first switching circuit 101 are also connected.

In some embodiments, one side port of the first tri-state level shifting circuit 105 is connected to the first output terminal of the first switching circuit 101, which may be directly connected to the first reverse differential pin 201 of the connector 200. Further, the first reverse differential pin 201 may also be directly connected to the clock switching circuit 103 to provide an ED differential clock signal to the clock switching circuit 103 in the ED interface mode.

In the RC interface mode, the first tri-state level shifting circuit 105 may operate normally, that is, it may perform level shifting between the connector 200 and the PCIe device 300 to transmit the RC reset signal and/or the RC in-place signal between the two. In this case, although the RC reset signal and/or the RC in-place signal may affect the ED differential clock signal, the effect on the differential clock signal may be ignored due to very low use signal rates of the reset signal and the in-place signal. That is, the first tri-state level shifting circuit 105 transmits the RC reset signal and/or the RC in-place signal, which basically does not affect the operation of the clock switching circuit 103.

However, in the ED interface mode, the first tri-state level shifting circuit 105 does not operate, and its port is in the high-impedance state, that is, the first output terminal of the first switching circuit 101 is in the high-impedance state. In this case, the ED differential clock signal is transmitted between the input terminal and the second output terminal of the first switching circuit 101, and the first tri-state level shifting circuit 105 in the high-impedance state has very little effect on the ED differential clock signal and basically does not affect the normal function of the ED differential clock signal. Therefore, the first reverse differential pin 201 of the connector 200 may normally provide the ED differential clock signal.

In some embodiments, with the first tri-state level shifting circuit 105 whose port output is in a high-impedance state when it is not operating, it is possible not only to realize level shifting between the connector 200 and the PCIe device 300 to isolate signals, but also not to affect the ED differential clock signal in the high-impedance state. The circuit structure of the first switching circuit 101 may be simplified to cause the first switching circuit 101 to transmit different signals in different modes, thereby realizing signal switching.

Figure 5:
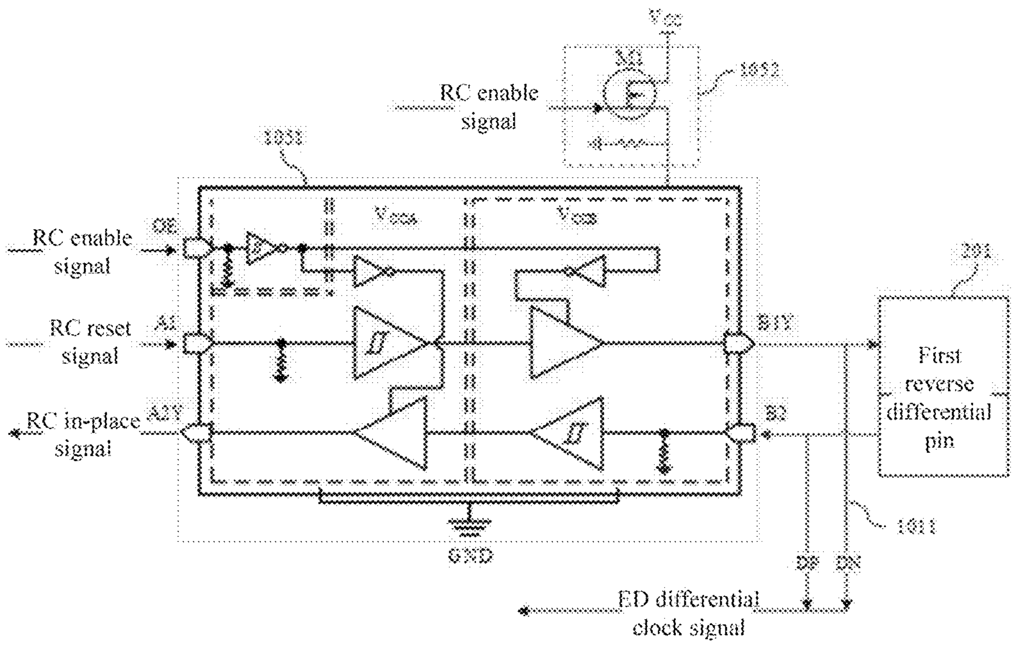
FIG. 5 is a schematic structural diagram of a first tri-state level shifting circuit according to some embodiments of the present application.

In some embodiments, as shown in FIG. 5, the first tri-state level shifting circuit 105 includes a first tri-state level shifter 1051. The first tri-state level shifter 1051 is configured to connect the first output terminal of the first switching circuit 101 and the first reset in-place terminal of the PCIe device 300. An enable terminal of the first tri-state level shifter 1051 is configured to be connected to an RC enable signal, and the RC enable signal is valid in the RC interface mode.

In some embodiments, data transmission between the connector 200 and the PCIe device 300 is achieved by the first tri-state level shifter 1051. For example, the first tri-state level shifter 1051 may be a directional level shifter, such as TXU0202. One channel (A1-B1Y shown in FIG. 5) is configured to send an RC reset signal to the first reverse differential pin 201 of the connector 200, and another channel (B2-A2Y shown in FIG. 5) is configured to send an RC in-place signal to the PCIe device 300.

The enable terminal (OE) of the first tri-state level shifter 1051 is connected to the RC enable signal, which is an enable signal generated by the PCIe device 300. In the RC interface mode, the PCIe device 300 outputs a valid RC enable signal, whereby the first tri-state level shifter 1051 may operate normally. On the contrary, in the ED interface mode, the PCIe device 300 outputs an invalid RC enable signal, whereby the port of the first tri-state level shifter 1051 is in a high-impedance state.

In general, when the enable terminal (OE) of the first tri-state level shifter 1051 is at a high level, the first tri-state level shifter 1051 may operate normally. That is, when the RC enable signal is at a high level, it is valid. In response to determining that the enable terminal (OE) of the first tri-state level shifter 1051 is at a low level, all output pins of the first tri-state level shifter 1051 are in the high-impedance state.

In some embodiments, the first tri-state level shifter 1051 is further provided with a power supply terminal, and the power supply terminal is generally connected to a high level. If the power supply terminal is connected to a low level, it will also cause all ports to be in the high-impedance state.

For example, as shown in FIG. 5, the power supply terminal may be $V_{CCA}$ or $V_{CCB}$. When the voltage of any one of $V_{CCA}$ or $V_{CCB}$ is less than 100 mV, all ports will exhibit a high-impedance state, that is, it is equivalent to an open circuit state that has no effect on the circuit. To ensure that the port may be in the high-impedance state in the ED interface mode, the voltage of the power supply terminal is also controlled based on a level circuit.

In some embodiments, as shown in FIG. 5, the first tri-state level shifting circuit 105 further includes: a first level circuit 1052. The first level circuit 1052 is connected to the power supply terminal of the first tri-state level shifter 1051. In the RC interface mode, the first level circuit 1052 is configured to provide a reference level, for example, 3.3 V, to the first tri-state level shifter 1051. In the ED interface mode, the first level circuit 1052 is configured to stop supplying power, whereby the power supply terminal of the first tri-state level shifter 1051 is at a low level, and each port thereof is in a high-impedance state.

In some embodiments, as shown in FIG. 5, the first level circuit 1052 includes: a first switching transistor M1. An input terminal of the first switching transistor M1 is connected to a power supply $V_{CC}$, and an output terminal the first switching transistor M1 is connected to the power supply terminal of the first tri-state level shifter 1051. A control terminal of the first switching transistor M1 is connected to an RC enable signal. When the RC enable signal is valid, the first switching transistor M1 is turned on.

For example, when the RC enable signal is valid at a high level, the first switching transistor M1 may be an N-metal-oxide-semiconductor (NMOS) transistor, the drain electrode and source electrode thereof are connected to the power supply $V_{CC}$ and the power supply terminal of the first tri-state level shifter 1051, respectively, and the gate electrode thereof is connected to the RC enable signal. When the RC enable signal is at the high level, the first switching transistor M1 is turned on, and the power supply $V_{CC}$ may provide the reference level. On the contrary, when the RC enable signal is at a low level, the first switching transistor M1 is turned off, the power supply terminal of the first tri-state level shifter 1051 is at a low level, and each port thereof is in a high-impedance state.

In addition, to ensure the signal quality of the clock signal, the clock signal line is generally not allowed to bifurcate. Therefore, in some embodiments, in the first switching circuit 101, the input terminal and the second output terminal of the first switching circuit 101 are directly connected through a first wire 1011. A pin of a side port of the first tri-state level shifting circuit 105 is arranged with a first via, and the first wire 1011 passes through the first via and is electrically connected with the first via.

In some embodiments, as shown in FIG. 5, the input terminal and the second output terminal of the first switching circuit 101 are directly connected through the first wire 1011, that is, the first reverse differential pin 201 and the clock switching circuit 103 are directly connected through the first wire 1011. It will be understood that this first wire 1011 needs to transmit an ED differential clock signal, and includes two wires. To prevent the clock signal line (i.e., the first wire 1011) from bifurcating, the pin of a side port of the first tri-state level shifting circuit 105 is arranged with a via, i.e., the first via. For example, the ports B1Y and B2 of the first tri-state level shifter 1051 are each arranged with a first via. The first wire 1011 passes through the first via, and the first wire 1011 is connected according to the layout of the in-plate hole, whereby the effect on the clock signal due to line bifurcation may be effectively avoided.

In some implementations, the second switching circuit 102 is also configured to realize switching between the differential clock signal and the reset in-place signal. For example, the second switching circuit 102 may be a MUX or the like to connect the first input terminal and the output terminal or connect the second input terminal and the output terminal of the second switching circuit 102 to realize the signal switching. In some embodiments, as shown in FIG. 4, the mode switching circuit further includes: a second tri-state level shifting circuit 106. Similar to the above-mentioned first tri-state level shifting circuit 105, the second tri-state level shifting circuit 106 realizes signal switching by outputting a high-impedance state.

As shown in FIG. 4, one side port of the second tri-state level shifting circuit 106 is connected to the first input terminal of the second switching circuit 102, and the other side port of the second tri-state level shifting circuit 106 is configured to be connected to the second reset in-place terminal of the PCIe device 300. In the RC interface mode, a port of the second tri-state level shifting circuit 106 is in a high-impedance state. In the ED interface mode, the second tri-state level shifting circuit 106 is configured to transmit an ED reset signal and/or an ED in-place signal. In this case, input and output terminals of the second switching circuit 102 may be directly turned on, that is, the first input terminal and the output terminal of the second switching circuit 102 are connected, and the second input terminal and the output terminal of the second switching circuit 102 are also connected.

In some embodiments, one side port of the second tri-state level shifting circuit 106 is connected to the first input terminal of the second switching circuit 102, which may be directly connected to the first front differential pin 202 of the connector 200. Further, the first front differential pin 202 may also be directly connected to the clock switching circuit 103 to acquire an RC differential clock signal provided by the clock switching circuit 103 in the RC interface mode.

In some embodiments, in the RC interface mode, the second tri-state level shifting circuit 106 does not operate, and its port is in the high-impedance state, that is, the first input terminal of the second switching circuit 102 is in the high-impedance state. In this case, the RC differential clock signal is transmitted between the second input terminal and the output terminal of the second switching circuit 102, and the second tri-state level shifting circuit 106 in the high-impedance state has very little effect on the RC differential clock signal and basically does not affect the normal function of the RC differential clock signal. Therefore, the clock switching circuit 103 may normally provide the RC differential clock signal to the first front differential pin 202 of the connector 200.

In the ED interface mode, the second tri-state level shifting circuit 106 may operate normally, that is, it may perform level shifting between the connector 200 and the PCIe device 300 to transmit the ED reset signal and/or the ED in-place signal between the two. In this case, although the ED reset signal and/or the ED in-place signal may affect the RC differential clock signal, the effect on the differential clock signal may be ignored due to very low use signal rates of the reset signal and the in-place signal. That is, the second tri-state level shifting circuit 106 transmits the ED reset signal and/or the ED in-place signal, which basically does not affect the operation of the clock switching circuit 103.

In some embodiments, with the second tri-state level shifting circuit 106 whose port output is in a high-impedance state when it is not operating, it is possible not only to realize level shifting between the connector 200 and the PCIe device 300 to isolate signals, but also not to affect the RC differential clock signal in the high-impedance state. The circuit structure of the second switching circuit 102 may be simplified to cause the second switching circuit 102 to transmit different signals in different modes, thereby realizing signal switching.

Figure 6:
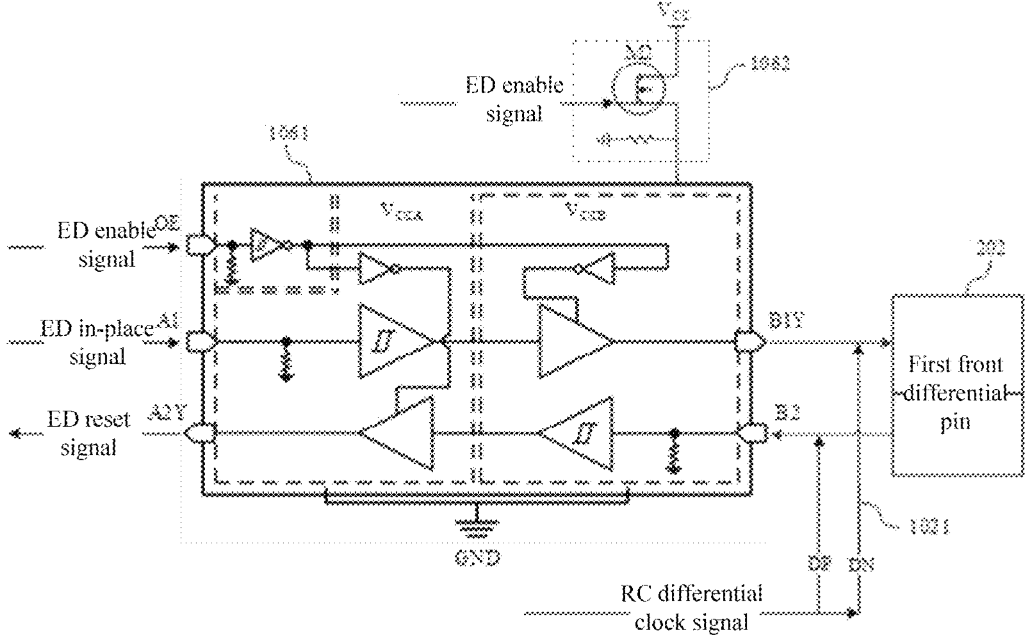
FIG. 6 is a schematic structural diagram of a second tri-state level shifting circuit according to some embodiments of the present application.

In some embodiments, as shown in FIG. 6, the second tri-state level shifting circuit 106 includes a second tri-state level shifter 1061. The second tri-state level shifter 1061 is configured to connect the first input terminal of the second switching circuit 102 and the second reset in-place terminal of the PCIe device 300. An enable terminal of the second tri-state level shifter 1061 is configured to be connected to an ED enable signal, and the ED enable signal is valid in the ED interface mode.

In some embodiments, data transmission between the connector 200 and the PCIe device 300 is achieved by the second tri-state level shifter 1061. For example, the second tri-state level shifter 1061 may be a directional level shifter, such as TXU0202. One channel (A1-B1Y shown in FIG. 6) is configured to send an ED in-place signal to the first front differential pin 202 of the connector 200, and another channel (B2-A2Y shown in FIG. 6) is configured to send an ED reset signal to the PCIe device 300.

The enable terminal (OE) of the second tri-state level shifter 1061 is connected to the ED enable signal, which is an enable signal generated by the PCIe device 300. In the ED interface mode, the PCIe device 300 outputs a valid ED enable signal, whereby the second tri-state level shifter 1061 may operate normally. On the contrary, in the RC interface mode, the PCIe device 300 outputs an invalid ED enable signal, whereby the port of the second tri-state level shifter 1061 is in a high-impedance state.

In general, when the enable terminal (OE) of the second tri-state level shifter 1061 is at a high level, the second tri-state level shifter 1061 may operate normally. That is, when the RC enable signal is at a high level, it is valid. In response to determining that the enable terminal (OE) of the second tri-state level shifter 1061 is at a low level, all output pins of the second tri-state level shifter 1061 are in the high-impedance state.

In some embodiments, as shown in FIG. 6, the second tri-state level shifting circuit 106 further includes: a second level circuit 1062. The second level circuit 1062 is connected to the power supply terminal of the second tri-state level shifter 1061. In the RC interface mode, the second level circuit 1062 is configured to stop supplying power, whereby the power supply terminal of the second tri-state level shifter 1061 is at a low level, and each port thereof is in a high-impedance state. In the ED interface mode, the second level circuit 1062 is configured to provide a reference level, for example, 3.3 V, to the second tri-state level shifter 1061.

In some embodiments, as shown in FIG. 6, the second level circuit 1062 includes: a second switching transistor M2. An input terminal of the second switching transistor M2 is connected to a power supply $V_{CC}$, and an output terminal the second switching transistor M2 is connected to the power supply terminal of the second tri-state level shifter 1061. A control terminal of the second switching transistor M2 is connected to an ED enable signal. When the ED enable signal is valid, the second switching transistor M2 is turned on.

For example, when the RC enable signal is valid at a high level, the second switching transistor M2 may be an NMOS transistor, the drain electrode and source electrode thereof are connected to the power supply $V_{CC}$ and the power supply terminal of the second tri-state level shifter 1061, respectively, and the gate electrode thereof is connected to the ED enable signal. When the ED enable signal is at the high level, the second switching transistor M2 is turned on, and the power supply $V_{CC}$ may provide the reference level. On the contrary, when the ED enable signal is at a low level, the second switching transistor M2 is turned off, the power supply terminal of the second tri-state level shifter 1061 is at a low level, and each port thereof is in a high-impedance state.

In addition, to ensure the signal quality of the clock signal, the clock signal line is generally not allowed to bifurcate. In some embodiments, in the second switching circuit 102, the second input terminal and the output terminal of the second switching circuit 102 are directly connected through a second wire 1021. A pin of a side port of the second tri-state level shifting circuit 106 is arranged with a second via, and the second wire 1021 passes through the second via and is electrically connected with the second via.

In some embodiments, as shown in FIG. 6, the second input terminal and the output terminal of the second switching circuit 102 are directly connected through the second wire 1021, that is, the first front differential pin 202 and the clock switching circuit 103 are directly connected through the second wire 1021. It will be understood that this second wire 1021 needs to transmit an RC differential clock signal, and includes two wires. To prevent the clock signal line (i.e., the second wire 1021) from bifurcating, the pin of a side port of the second tri-state level shifting circuit 106 is arranged with a via, i.e., the second via. For example, the ports B1Y and B2 of the second tri-state level shifter 1061 are each arranged with a second via. The second wire 1021 passes through the second via, and the second wire 1021 is connected according to the layout of the in-plate hole, whereby the effect on the clock signal due to line bifurcation may be effectively avoided.

Figure 7:
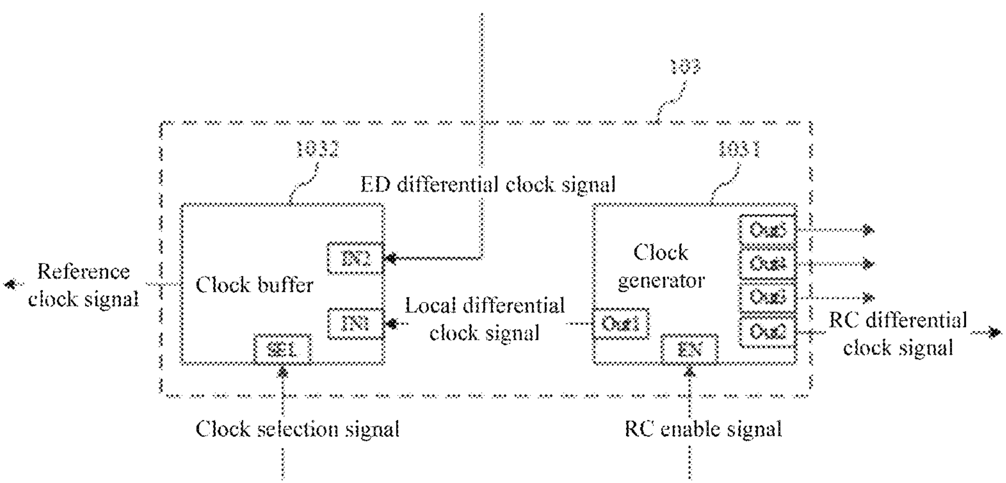
FIG. 7 is a schematic structural diagram of a clock switching circuit according to some embodiments of the present application.

In some implementations, as shown in FIG. 7, the clock switching circuit 103 includes: a clock generator 1031 and a clock buffer 1032.

A first output terminal (Out1) of the clock generator 1031 is connected to a first input terminal (IN1) of the clock buffer 1032 and configured to output a local differential clock signal in the RC interface mode. A second output terminal (Out2) of the clock generator 1031 is connected to the second input terminal of the second switching circuit 102, for example, to the first front differential pin 202, and is configured to output an RC differential clock signal in the RC interface mode.

A second input terminal (IN2) of the clock buffer 1032 is connected to the second output terminal of the first switching circuit 101, for example, to the first reverse differential pin 201, and is configured to receive an ED differential clock signal in the ED interface mode. Further, the clock buffer 1032 is configured to generate a reference clock signal sent to the PCIe device 300 according to the local differential clock signal or the ED differential clock signal.

In some embodiments, in the RC interface mode, the clock generator 1031 operates normally, whereby the clock switching circuit 103 may output the RC differential clock signal and generate the local differential clock signal to provide the reference clock signal to the PCIe device 300. In the ED interface mode, the clock generator 1031 stops operating, and the second input terminal (IN2) of the clock buffer 1032 acquires a differential clock signal, i.e., the ED differential clock signal, sent by an opposite terminal, thereby generating the reference clock signal that may be provided to the PCIe device 300.

In some embodiments, as shown in FIG. 7, an enable terminal (EN) of the clock generator 1031 is configured to be connected to an RC enable signal. The RC enable signal is valid in the RC interface mode, and when the RC enable signal is valid, the clock generator 1031 outputs the local differential clock signal and the RC differential clock signal. When the RC enable signal is invalid, that is, in the ED interface mode, the clock generator 1031 is not enabled and does not operate, that is, does not output the RC differential clock signal or the like.

Further, as shown in FIG. 7, a selection terminal (SEL) of the clock buffer 1032 is configured to be connected to a clock selection signal. When the clock selection signal represents the RC interface mode, the first input terminal (IN1) of the clock buffer 1032 is valid. When the clock selection signal represents the ED interface mode, the second input terminal (IN2) of the clock buffer 1032 is valid. For example, when the clock selection signal is at a low level, the first input terminal (IN1) is selected to be used, that is, the first input terminal (IN1) is valid. When the clock selection signal is at a high level, the second input terminal (IN2) is selected to be used, that is, the second input terminal (IN2) is valid, thereby realizing the switching of the input clock.

In some embodiments, the clock selection signal may be a signal generated by the PCIe device 300, or the clock selection signal may also be an RC enable signal or an ED enable signal. In some embodiments, in the RC interface mode, the PCIe device 300 generates a valid RC enable signal and clock selection signal, and the enable terminal of the clock generator 1031 is valid, for example, at a high level (that is, the RC enable signal is at a high level in this case). In this case, the first output terminal (Out1) of the clock generator 1031 outputs the local differential clock signal, and the second output terminal (Out2) of the clock generator 1031 outputs the RC differential clock signal. Further, under the action of the clock selection signal, the clock buffer 1032 selects that the first input terminal (IN1) is valid and the second input terminal (IN2) is invalid, that is, the clock buffer 1032 does not pay attention to the signal acquired by the second input terminal (IN2).

However, in the ED interface mode, the PCIe device 300 generates an invalid RC enable signal and clock selection signal, and the enable terminal of the clock generator 1031 is invalid and does not operate. For example, all output ports are in a high-impedance state. In addition, under the action of the clock selection signal, the clock buffer 1032 selects that the first input terminal (IN1) is invalid and the second input terminal (IN2) is valid, that is, the clock buffer 1032 does not pay attention to the signal acquired by the first input terminal (IN1), but acquires the ED differential clock signal based on the second input terminal (IN2), thereby providing a corresponding reference clock signal to the PCIe device 300. Thus, the PCIe device 300 may operate based on the ED differential clock signal provided by the opposite terminal.

Since the connector 200 may operate in a mode having a large number of channels, such as an X8 mode and an X16 mode, and there may be 200 connectors, it may be necessary to provide a plurality of sets of differential clock signals externally. In some embodiments, the clock generator 1031 may output a plurality of sets of differential clock signals. As shown in FIG. 7, the clock generator 1031 may output five clock signals, where one channel (Out1) is a local differential clock signal, another channel (Out2) is an RC differential clock signal, and the remaining output terminals (Out3, Out4, and Out5) may also provide corresponding differential clock signals externally.

In some embodiments, the clock generator 1031 and the clock buffer 1032 may realize the switching of clock signals in different modes. When used as RC master devices, the clock generator 1031 and the clock buffer 1032 may provide the RC differential clock signal to the opposite terminal, and when used as ED slave devices, may operate based on the ED differential clock signal provided by the opposite end terminal.

In some embodiments, the mode switching circuit further includes: a mode selection circuit 109. The mode selection circuit 109 is configured to provide the PCIe device 300 with a mode selection signal indicating that an RC interface mode is currently selected or an ED interface mode is currently selected.

In some embodiments, the user may actively select a required mode based on a hardware structure provided by the mode selection circuit 109. In some embodiments, the mode selection circuit 109 is connected to the PCIe device 300, and based on the mode selection circuit 109, may send the mode selection signal to the PCIe device 300 to actively select whether the RC interface mode or the ED interface mode is currently needed.

Figure 8:
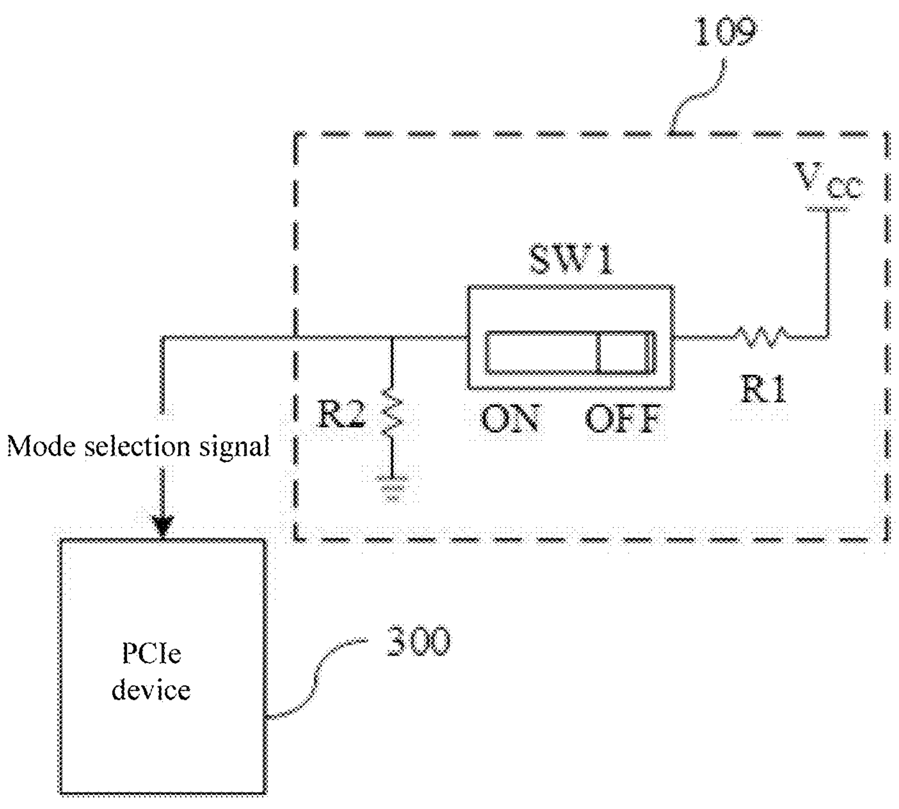
FIG. 8 is a schematic structural diagram of a mode selection circuit according to some embodiments of the present application.

In some embodiments, as shown in FIG. 8, the mode selection circuit 109 includes: a selector switch SW1, a first resistor R1, and a second resistor R2. As shown in FIG. 8, one terminal of the first resistor R1 is connected to a power supply $V_{CC}$, and the other terminal of the first resistor R1 is sequentially connected to ground through the selector switch SW1 and the second resistor R2. In some embodiments, one terminal of the selector switch SW1 is connected to the power supply $V_{CC}$, and the other terminal of the selector switch SW1 is sequentially connected to ground through the first resistor R1 and the second resistor R2.

The first resistor R1 and the second resistor R2 form a voltage dividing circuit, and the selector switch SW1 is configured to control whether a loop in which the first resistor R1 and the second resistor R2 are located is turned on. For example, as shown in FIG. 8, the selector switch SW1 is a dual in-line package (DIP) switch, and when the DIP switch is ON, the DIP switch is turned on, and the power supply $V_{CC}$ may supply power. When the DIP switch is set to OFF, the DIP switch is turned off, and the power supply $V_{CC}$ may not supply power.

Further, as shown in FIG. 8, a terminal of the second resistor R2 close to the first resistor R1 is configured to be connected to the PCIe device 300 to provide a mode selection signal. When the selector switch SW1 is turned on, for example, when the DIP switch is set to ON, the power supply $V_{CC}$ may supply power. In this case, a connection node between the first resistor R1 and the second resistor R2 has a level, and the mode selection circuit 109 outputs a high-level mode selection signal. When the selector switch SW1 is turned off, for example, when the DIP switch is set to OFF, the power supply $V_{CC}$ does not supply power. In this case, a voltage of the connection node between the first resistor R1 and the second resistor R2 is 0. Thus, the mode selection circuit 109 outputs a low-level mode selection signal.

In some embodiments, by turning on/off the selector switch SW1, the high-level and low-level mode selection signals may be outputted to the PCIe device 300, whereby the PCIe device 300 may know which mode it should be currently operated in, thereby realizing mode switching. Further, by operating the selector switch SW1, it is possible to select whether the connector 200 is a PCIe RC master device or a PCIe ED slave device, and the switching is flexible.

In some implementations, if the connector 200 is an X8-mode connector, for example, an MCIO X8 connector, the connector 200, in addition to including low-speed auxiliary signal pins such as the first reverse differential pin 201, the first front differential pin 202, the second reverse differential pin 203, and the second front differential pin 204, further includes a third reverse differential pin 205, a third front differential pin 206, a fourth reverse differential pin 207, a fourth front differential pin 208, and the like.

Similar to the first reverse differential pin 201, the first front differential pin 202, the second reverse differential pin 203, and the second front differential pin 204, one of the third reverse differential pin 205 and the third front differential pin 206 is configured to transmit a differential clock signal (for example, PCIe_CLK_DN/DP), and the other is configured to transmit a reset signal (for example, PCIe_RESET) and/or an in-place signal (for example, PCIe_PRSNT). For example, the third reverse differential pin 205 may be pins B29 and B30 in Table 1 or Table 2, and the third front differential pin 206 may be pins A29 and A30 in Table 1 or Table 2. One of the fourth reverse differential pin 207 and the fourth front differential pin 208 is configured to transmit an I2C bus signal (for example, MCIO_SDA/SCL), and the other is configured to transmit a wake-up signal (for example, PCIe_WAKE) and/or an ID signal (for example, MCIO_ID). For example, the fourth reverse differential pin 207 may be pins B26 and B27 in Table 1 or Table 2, and the fourth front differential pin 208 may be pins A26 and A27 in Table 1 or Table 2.

Figure 9:
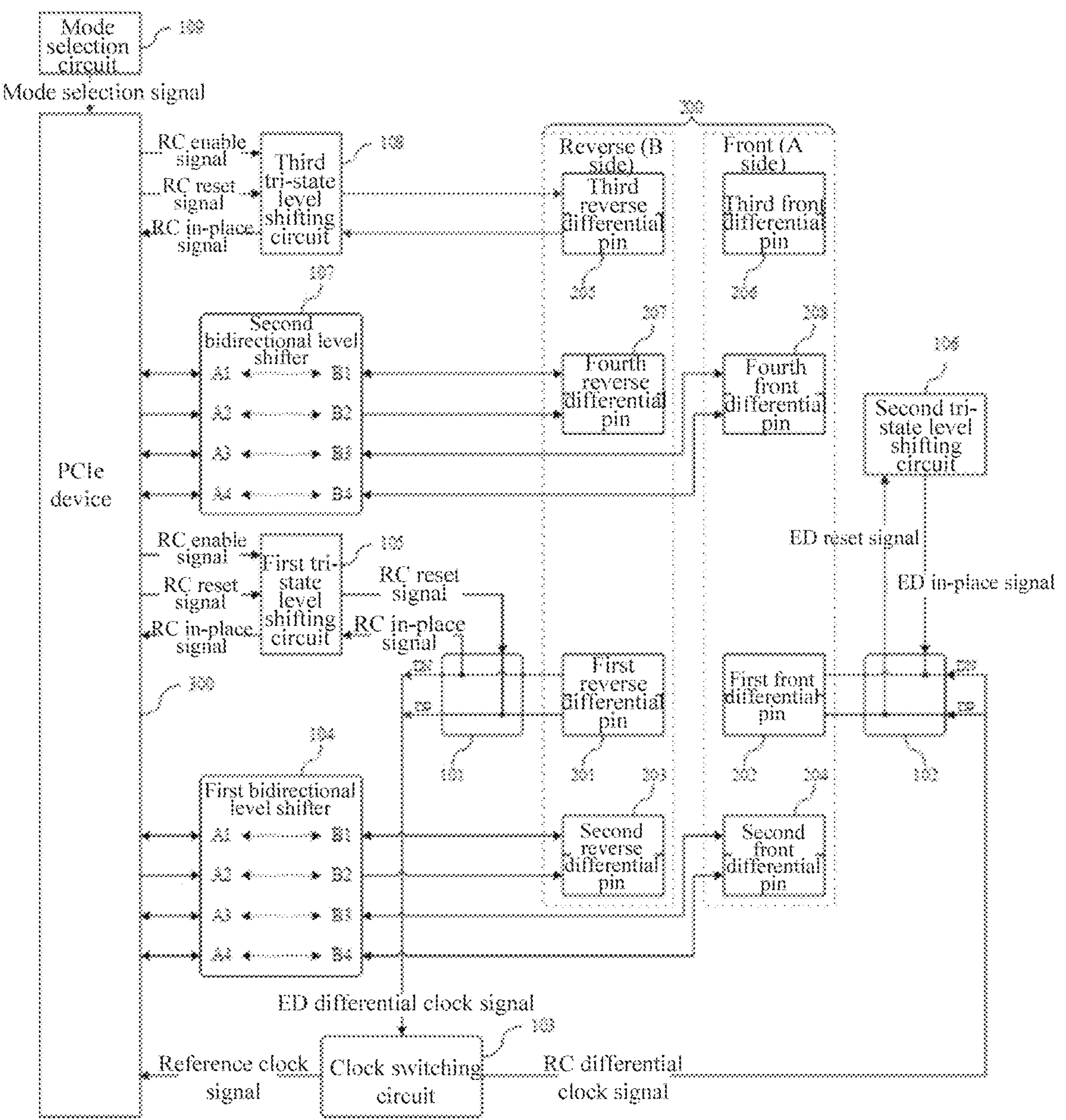
FIG. 9 is a third schematic structural diagram of a mode switching circuit according to some embodiments of the present application.

For a connector supporting the X8 mode, as shown in FIG. 9, the mode switching circuit further includes: a second bidirectional level shifter 107 and a third tri-state level shifter circuit 108.

One side port of the third tri-state level shifting circuit 108 is connected to the third reverse differential pin 205 of the connector 200, and the other side port is configured to be connected to a third reset in-place terminal of the PCIe device 300. The third reset in-place terminal of the PCIe device 300 is also configured to transmit the RC reset signal and the RC in-place signal. It will be understood that the third reset in-place terminal includes two ports, i.e., a third reset terminal and a third in-place terminal, which are configured to send the RC reset signal and receive the RC in-place signal, respectively.

A first set of level shifting channels of the second bidirectional level shifter 107 is configured to transmit data between the fourth reverse differential pin 207 of the connector 200 and a third data terminal of the PCIe device 300, and a second set of level shifting channels of the second bidirectional level shifter 107 is configured to transmit data between the fourth front differential pin 208 of the connector 200 and a fourth data terminal of the PCIe device 300.

In some embodiments, an operating principle of the third tri-state level shifting circuit 108 is similar to that of the above-mentioned first tri-state level shifting circuit 105. For example, the third tri-state level shifting circuit 108 and the first tri-state level shifting circuit 105 have the same structure. In addition, an operating principle of the second bidirectional level shifter 107 is also similar to that of the first bidirectional level shifter 104. For example, the second bidirectional level shifter 107 and the first bidirectional level shifter 104 have the same structure. The first bidirectional level shifter 104 and the second bidirectional level shifter 107 may each be a level shifting module that supports an I2C bus and a general purpose input output (GPIO) signal, such as LSF0204, whereby a GPIO pin of the PCIe device 300 may be connected after level shifting to transmit an I2C bus signal, a wake-up signal, and the like to the PCIe device 300.

In some embodiments, in the RC interface mode, the third tri-state level shifting circuit 108 is configured to transmit the RC reset signal and/or the RC in-place signal. The first set of level shifting channels of the second bidirectional level shifter 107 is configured to transmit the I2C bus signal, and the second set of level shifting channels of the second bidirectional level shifter 107 is configured to transmit the wake-up signal and/or the ID signal. In addition, the third front differential pin 206 provides a differential clock signal to an opposite terminal. For example, as shown in FIG. 7, another output terminal, such as an output terminal Out3, of the clock generator 1031 may provide a corresponding differential clock signal to the third front differential pin 206 to provide the differential clock signals to an opposite-terminal device.

In the ED interface mode, a port of the third tri-state level shifting circuit 108 is in a high-impedance state. The first set of level shifting channels of the second bidirectional level shifter 107 is configured to transmit the wake-up signal and/or the ID signal, and the second set of level shifting channels of the second bidirectional level shifter 107 is configured to transmit the I2C bus signal.

In some embodiments, when the connector 200 connected to the mode switching circuit operates in an X8 mode, the third reverse differential pin 205, the third front differential pin 206, the fourth reverse differential pin 207, and the fourth front differential pin 208 are all invalid. Thus, the second bidirectional level shifter 107 and the third tri-state level shifting circuit 108 may not operate. When the connector 200 operates in an X4 mode, the connector 200 may be divided into two X4-mode connectors, that is, it may support two X4 external devices. In this case, the third tri-state level shifting circuit 108 and the first tri-state level shifting circuit 105 correspond to different external devices, and both correspond to different RC reset signals and RC in-place signals. Similarly, the second bidirectional level shifter 107 and the first bidirectional level shifter 104 also correspond to different external devices.

The mode switching circuit provided by some embodiments may be applied to the X4-mode connector or the X8-mode connector, is still applicable when two X8-mode connectors are combined as a connector of an X16 specification, and has wide applicability.

In some embodiments, a mode switching method is provided. The method is implemented based on any one of the mode switching circuits provided in the above-mentioned embodiments. For example, the method may be implemented based on the mode switching circuit shown in FIG. 1. In different modes, the method performs different steps. In some embodiments, in an RC interface mode, the method includes the following steps a1 to a4; and in an ED interface mode, the method includes the following steps b1 to b4:

step a1: controlling a first switching circuit 101 to transmit an RC reset signal and/or an RC in-place signal between a first reverse differential pin 201 of a connector 200 and a first reset in-place terminal of a PCIe device 300;

step a2: controlling a clock switching circuit 103 to generate a reference clock signal sent to the PCIe device 300 and an RC differential clock signal sent to a second switching circuit 102;

step a3: controlling the second switching circuit 102 to send the RC differential clock signal to a first front differential pin 202 of the connector 200;

step a4: controlling a first set of level shifting channels of a first bidirectional level shifter 104 to transmit an I2C bus signal, and controlling a second set of level shifting channels of the first bidirectional level shifter 104 to transmit a wake-up signal and/or an ID signal;

step b1: controlling the first switching circuit 101 to send an ED differential clock signal transmitted by the first reverse differential pin 201 of the connector 200 to the clock switching circuit 103;

step b2: controlling the clock switching circuit 103 to generate a reference clock signal sent to the PCIe device 300 according to the ED differential clock signal;

step b3: controlling the second switching circuit 102 to transmit an ED reset signal and/or an ED in-place signal between the first front differential pin 202 of the connector 200 and a second reset in-place terminal of the PCIe device 300; and step b4: controlling the first set of level shifting channels of the first bidirectional level shifter 104 to transmit the wake-up signal and/or the ID signal, and controlling the second set of level shifting channels of the first bidirectional level shifter 104 to transmit the I2C bus signal.

In some embodiments, the principle of the above-described steps a1 to a4 and steps b1 to b4 are the same as that of the mode switching circuit shown in FIG. 1, and will not be described in detail here. The mode switching method may be performed by the PCIe device 300, that is, the PCIe device 300 may control operation conditions of the first switching circuit 101, the second switching circuit 102, the control clock switching circuit 103, and the first bidirectional level shifter 104 in different modes, thereby realizing master-slave mode compatibility as a corresponding master device or slave device in the RC interface mode or the ED interface mode.

In some embodiments, an expansion connector is provided to expand the PCIe device 300. In some embodiments, the expansion connector includes: a connector 200 and any one of the mode switching circuits provided in the above-mentioned embodiments.

In some embodiments, according to the mode switching circuit, an RC interface and an ED interface may be uniformly implemented on the same connector 200, whereby the expansion connector has universality and may support arbitrary switching of master-slave modes, thereby realizing that the device may seamlessly connect various application scenes.

In some embodiments, a PCIe card is provided, including: a PCIe device 300 and at least one expansion connector as described above. The PCIe device 300 is provided with RC firmware and ED firmware. In an RC interface mode, the PCIe device 300 loads the RC firmware. In an ED interface mode, the PCIe device 300 loads the ED firmware.

In some embodiments, the RC firmware and the ED firmware are provided in advance in the PCIe device 300. In the RC interface mode, for example, when it is determined based on the mode selection signal outputted by the mode selection circuit 109 that the current mode is the RC interface mode, the PCIe device 300 loads the RC firmware, whereby the first reset in-place terminal of the PCIe device 300 is set to be configured to send the RC reset signal and receive the RC in-place signal, the first data terminal is set to be configured to transmit the I2C bus signal, the second data terminal is set to be configured to transmit the wake-up signal and/or the ID signal, and the function of a port connected to the first bidirectional level shifter 104 is set. In the ED interface mode, the PCIe device 300 loads the ED firmware, The first reset in-place terminal of the PCIe device 300 does not operate, the first data terminal is set to be configured to transmit the wake-up signal and/or the ID signal, the second data terminal is set to be configured to transmit the I2C bus signal, and the function of the port connected to the first bidirectional level shifter 104 is set.

The PCIe bus interface of the PCIe device 300 is connected to the expansion connector and may be connected to a high-speed differential signal interface of the expansion connector through an R-tile hardware interface, for example, to a differential pair, such as PCIe_RX_DP/DN[0:7] and PCIe_TX_DP/DN[0:7], of the connector. In addition, the PCIe device 300 may be connected to a low-speed auxiliary signal through a GPIO pin, that is, the first reset in-place terminal, the first data terminal, and the like are both GPIO pins.

In some embodiments, in a case that the expansion connector includes the mode selection circuit 109, the PCIe device 300 is configured to: load RC firmware in response to an RC mode instruction triggered based on the mode selection circuit 109; and load ED firmware in response to an ED mode instruction triggered based on the mode selection circuit 109.

In some embodiments, taking the mode selection circuit 109 shown in FIG. 8 as an example, in response to determining that the selector switch SW1 is set to ON, a high-level mode selection signal may be provided to the PCIe device 300, which is equivalent to inputting the RC mode instruction. Thus, the PCIe device 300 may load the RC firmware to control the mode switching circuit to operate in the RC interface mode, for example, output a high-level RC enable signal. On the contrary, in response to determining that the selector switch SW1 is set to OFF, a low-level mode selection signal may be provided to the PCIe device 300, which is equivalent to inputting the ED mode instruction. Thus, the PCIe device 300 may load the ED firmware to control the mode switching circuit to operate in the ED interface mode, for example, output a high-level ED enable signal.

In some embodiments, the PCIe device 300 includes an Ethernet optical port. The Ethernet optical port is configured to be connected to a remote server, thereby realizing storage data sharing and migration.

Figure 10:
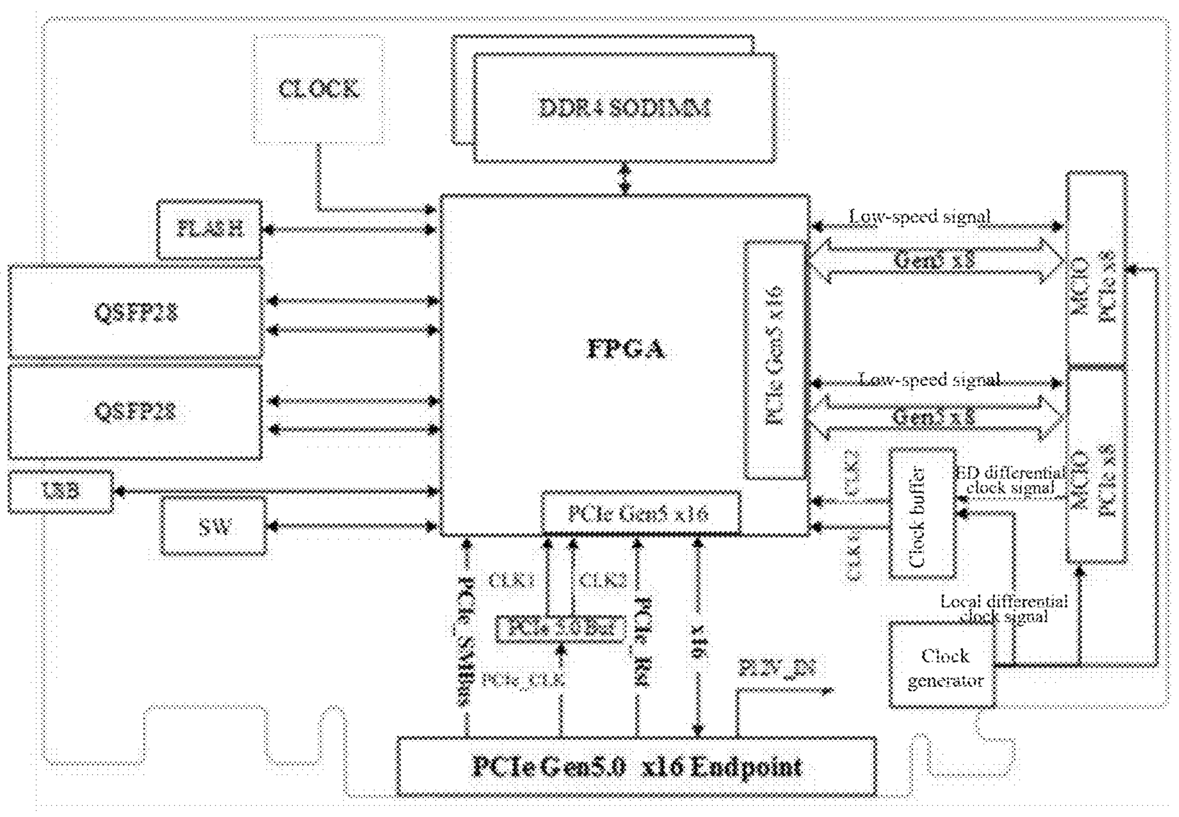
FIG. 10 is a schematic structural diagram of a PCIe card according to some embodiments of the present application.

For example, taking the PCIe device 300 using an FPGA as a main processing core as an example, a schematic structural diagram of a PCIe card may be shown in FIG. 10. As shown in FIG. 10, in the PCIe card, a periphery of the FPGA is equipped with a double data rate synchronous dynamic random access memory (DDR SODIMM, such as DDR4 SODIMM), 2 Ethernet optical ports, and some basic devices. FIG. 10 shows an example in which the Ethernet optical port is QSFP28 of 100 G. In addition, the FPGA is provided with two PCIe Gen5 ×16 interfaces, one of which is an ED end slave mode device interface (PCIe Gen5.0 ×16 Endpoint) of a golden finger mode, and the other implements interface expansion through the expansion connector provided by some embodiments. In FIG. 10, the PCIe Gen5 ×16 interface is expanded with two x8 expansion connectors (MCIO PCIe x8).

As mentioned above, the expansion connector supports the RC master device port and the ED slave device port. The two interfaces realize the compatibility design on the same interface, and the external support and server synchronization interface definition mode. The same cable may be inserted into the server to connect to a PCIe bus of the server, or may be directly connected to a normal MCIO expansion slave device within the server, such as an NVMe hard disk, whereby the PCIe card may be used as an RC host port.

Figure 11:
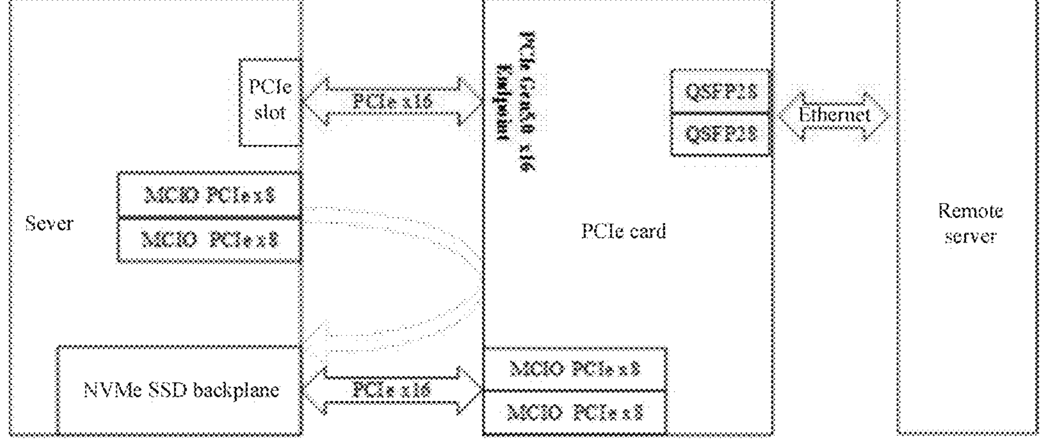
FIG. 11 is a schematic diagram of an architecture of a PCIe card and a server in an RC interface mode according to some embodiments of the present application.

For example, the PCIe card shown in FIG. 10 may be used in an expansion scene of the server. As shown in FIG. 11, one terminal (PCIe Gen5.0 ×16 Endpoint) of the PCIe card operating in the golden finger mode may be connected to a PCIe slot of the server. The interface of the PCIe card is defined as an RC interface mode and may be connected to a backplane interface of an NVMe expansion hard disk. Since the definition of the PCIe card interface in some embodiments is consistent with the interface definition of the server, a cable (the cable corresponding to the dotted line in FIG. 11) in the server may be directly replaced with the PCIe card, thereby realizing the architecture design of storage acceleration. In addition, the PCIe card may also be connected to a remote server through Ethernet, thereby realizing storage data sharing and migration.

Figure 12:
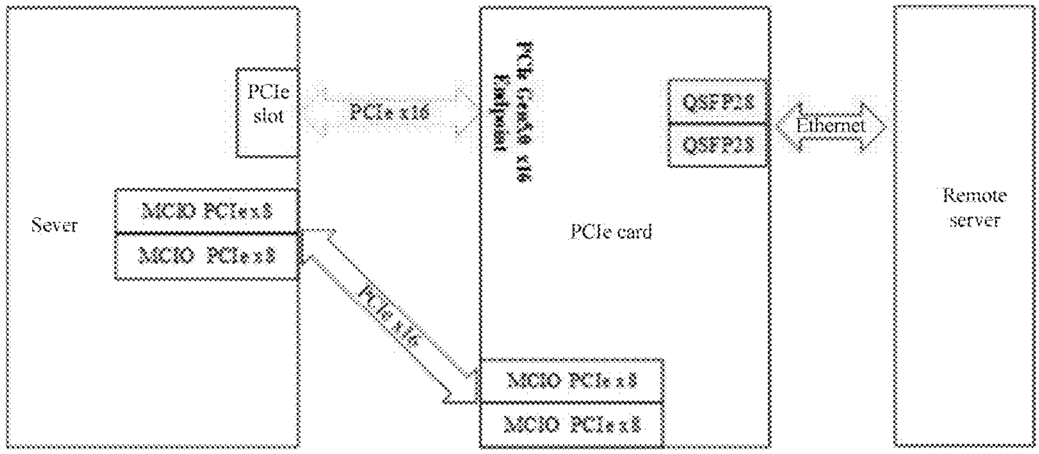
FIG. 12 is a schematic diagram of an architecture of a PCIe card and a server in an ED interface mode according to some embodiments of the present application.

As shown in FIG. 12, if the interface of the PCIe card is defined as an ED interface mode, the interface may be directly connected to the MCIO interface (MCIO PCIe x8) of the server through a cable, thereby realizing the expansion of the PCIe device. Since the interfaces are compatible, it is only necessary to change the connecting position of the cable, and then turn on the selector switch SW1 on the PCIe card mode selection circuit 109 to realize a brand-new architecture mode.

In some embodiments, according to the mode switching circuit, different interface definitions may be implemented on the same connector, whereby the RC interface mode and the ED interface mode are supported on the same connector, and the two modes may be compatible. Thus, the PCIe device 300 may flexibly switch the PCIe master-slave mode, which is reusable and has strong compatibility. The PCIe card may be used as a slave device to connect to the server host, or as a master device to connect to the external device, such as an expansion NVMe hard disk and an expansion network card. Thus, the card replacement and hardware costs are greatly saved, more application possibilities are provided for the PCIe bus architecture, such as computing acceleration, network acceleration, and storage acceleration, and finally, better cost performance as well as ideal network and storage device deployment solutions may be achieved. In addition, when the PCIe device 300 is an FPGA device, the flexible and reconfigurable characteristics of the FPGA may be fully utilized to realize flexible switching in different application scenes, greatly increasing the application flexibility of the FPGA accelerator, and reducing the deployment cost of the hardware architecture. Further, this flexible master-slave mode switching mode is convenient to simplify the internal architecture of the server and reduce the cost.

Although the embodiments of the present application have been described with reference to the accompanying drawings, various modifications and variations may be made by a person skilled in the art without departing from the spirit and scope of the present application, and these modifications and variations fall within the scope defined by the appended claims.

The invention claimed is:

1. A mode switching circuit, comprising: a first switching circuit, a second switching circuit, a clock switching circuit, and a first bidirectional level shifter, wherein an input terminal of the first switching circuit is configured to be connected to a first reverse differential pin of a connector, a first output terminal of the first switching circuit is configured to be connected to a first reset in-place terminal of a peripheral component interconnect express (PCIe) device, and a second output terminal of the first switching circuit is connected to the clock switching circuit; the first switching circuit is configured to transmit at least one of a root complex (RC) reset signal or an RC in-place signal between the first reverse differential pin and the first reset in-place terminal, or send an endpoint (ED) differential clock signal transmitted by the first reverse differential pin to the clock switching circuit;

a first input terminal of the second switching circuit is configured to be connected to a second reset in-place terminal of the PCIe device, a second input terminal of the second switching circuit is connected to the clock switching circuit, and an output terminal of the second switching circuit is configured to be connected to a first front differential pin of the connector; the second switching circuit is configured to send an RC differential clock signal to the first front differential pin, or at least one of transmit an ED reset signal or an ED in-place signal between the first front differential pin and the second reset in-place terminal;

the clock switching circuit is configured to generate a reference clock signal sent to the PCIe device and the RC differential clock signal sent to the second switching circuit, or generate the reference clock signal sent to the PCIe device according to the ED differential clock signal; and a first set of level shifting channels of the first bidirectional level shifter is configured to transmit data between a second reverse differential pin of the connector and a first data terminal of the PCIe device, and a second set of level shifting channels of the first bidirectional level shifter is configured to transmit data between a second front differential pin of the connector and a second data terminal of the PCIe device; two sets of level shifting channels of the first bidirectional level shifter are capable of being configured to transmit an inter-integrated circuit (I2C) bus signal or to transmit at least one of a wake-up signal or an identification (ID) signal.

2. The mode switching circuit according to claim 1, characterized by further comprising: a first tri-state level shifting circuit, wherein a first side port of the first tri-state level shifting circuit is connected to the first output terminal of the first switching circuit, and a second side port of the first tri-state level shifting circuit is configured to be connected to the first reset in-place terminal of the PCIe device;

the first tri-state level shifting circuit is configured to: transmit the at least one of the RC reset signal or the RC in-place signal in an RC interface mode; or a port of the first tri-state level shifting circuit is in a high-impedance state in an ED interface mode.

3. The mode switching circuit according to claim 2, wherein the first tri-state level shifting circuit comprises a first tri-state level shifter; the first tri-state level shifter is configured to connect the first output terminal of the first switching circuit and the first reset in-place terminal of the PCIe device; and an enable terminal of the first tri-state level shifter is configured to be connected to an RC enable signal, and the RC enable signal is valid in the RC interface mode.

4. The mode switching circuit according to claim 3, wherein the first tri-state level shifting circuit further comprises: a first level circuit; the first level circuit is connected to a power supply terminal of the first tri-state level shifter;

the first level circuit is configured to: provide a reference level to the first tri-state level shifter in the RC interface mode; or the first level circuit is configured to: stop supplying power in the ED interface mode.

5. The mode switching circuit according to claim 4, wherein the first level circuit comprises: a first switching transistor;

an input terminal of the first switching transistor is connected to a power supply, and an output terminal of the first switching transistor is connected to the power supply terminal of the first tri-state level shifter; and a control terminal of the first switching transistor is connected to the RC enable signal; and in response to determining that the RC enable signal is valid, the first switching transistor is turned on.

6. The mode switching circuit according to claim 2, wherein in the first switching circuit, the input terminal and the second output terminal of the first switching circuit are directly connected through a first wire; and a pin of the second side port of the first tri-state level shifting circuit is arranged with a first via, and the first wire passes through the first via and is electrically connected with the first via.

7. The mode switching circuit according to claim 1, comprising: a second tri-state level shifting circuit, wherein a first side port of the second tri-state level shifting circuit is connected to the first input terminal of the second switching circuit, and a second side port of the second tri-state level shifting circuit is configured to be connected to the second reset in-place terminal of the PCIe device;

a port of the second tri-state level shifting circuit is in a high-impedance state in an RC interface mode; or the second tri-state level shifting circuit is configured to: transmit the at least one of the ED reset signal and/or the ED in-place signal in an ED interface mode.

8. The mode switching circuit according to claim 7, wherein the second tri-state level shifting circuit comprises a second tri-state level shifter; the second tri-state level shifter is configured to connect the first input terminal of the second switching circuit and the second reset in-place terminal of the PCIe device; and an enable terminal of the second tri-state level shifter is configured to be connected to an ED enable signal, and the ED enable signal is valid in the ED interface mode.

9. The mode switching circuit according to claim 8, wherein the second tri-state level shifting circuit further comprises: a second level circuit; the second level circuit is connected to a power supply terminal of the second tri-state level shifter;

the second level circuit is configured to: stop supplying power in the RC interface mode; or the second level circuit is configured to: provide a reference level to the second tri-state level shifter in the ED interface mode.

10. The mode switching circuit according to claim 9, wherein the second level circuit comprises: a second switching transistor;

an input terminal of the second switching transistor is connected to a power supply, and an output terminal of the second switching transistor is connected to the power supply terminal of the second tri-state level shifter; and a control terminal of the second switching transistor is connected to the ED enable signal; and in response to determining that the ED enable signal is valid, the second switching transistor is turned on.

11. The mode switching circuit according to claim 7, wherein in the second switching circuit, the second input terminal and the output terminal of the second switching circuit are directly connected through a second wire; and a pin of the first side port of the second tri-state level shifting circuit is arranged with a second via, and the second wire-passes through the second via and is electrically connected with the second via.

12. The mode switching circuit according to claim 1, comprising: a second bi-directional level shifter and a third tri-state level shifting circuit, wherein a first side port of the third tri-state level shifting circuit is connected to a third reverse differential pin of the connector, and a second side port of the third tri-state level shifting circuit is configured to be connected to a third reset in-place terminal of the PCIe device;

a first set of level shifting channels of the second bidirectional level shifter is configured to transmit data between a fourth reverse differential pin of the connector and a third data terminal of the PCIe device, and a second set of level shifting channels of the second bidirectional level shifter is configured to transmit data between a fourth front differential pin of the connector and a fourth data terminal of the PCIe device;

the third tri-state level shifting circuit is configured to transmit the at least one of the RC reset signal and/or the RC in-place signal in an RC interface mode; the first set of level shifting channels of the second bidirectional level shifter is configured to transmit the I2C bus signal, and the second set of level shifting channels of the second bidirectional level shifter is configured to transmit the at least one of the wake-up signal or the ID signal; or a port of the third tri-state level shifting circuit is in a high-impedance state in an ED interface mode; the first set of level shifting channels of the second bidirectional level shifter is configured to transmit the at least one of the wake-up signal or the ID signal, and the second set of level shifting channels of the second bidirectional level shifter transmits the I2C bus signal.

13. The mode switching circuit according to claim 1, wherein the clock switching circuit comprises: a clock generator and a clock buffer;

a first output terminal of the clock generator is connected to a first input terminal of the clock buffer and configured to output a local differential clock signal in an RC interface mode;

a second output terminal of the clock generator is connected to the second input terminal of the second switching circuit and configured to output the RC differential clock signal in the RC interface mode;

a second input terminal of the clock buffer is connected to the second output terminal of the first switching circuit and configured to receive the ED differential clock signal in an ED interface mode; and the clock buffer is configured to generate the reference clock signal sent to the PCIe device according to the local differential clock signal or the ED differential clock signal.

14. The mode switching circuit according to claim 13, wherein an enable terminal of the clock generator is configured to be connected to an RC enable signal; the RC enable signal is valid in the RC interface mode; and in response to determining that the RC enable signal is valid, the clock generator-outputs the local differential clock signal and the RC differential clock signal.

15. The mode switching circuit according to claim 13, wherein a selection terminal of the clock buffer is configured to be connected to a clock selection signal;

in response to determining that the clock selection signal represents the RC interface mode, the first input terminal of the clock buffer is valid; or in response to determining that the clock selection signal represents the ED interface mode, the second input terminal of the clock buffer is valid.

16. The mode switching circuit according to claim 1, further comprising: a mode selection circuit, wherein the mode selection circuit is configured to provide the PCIe device with a mode selection signal indicating that an RC interface mode is currently selected or an ED interface mode is currently selected.

17. The mode switching circuit according to claim 16, wherein the mode selection circuit comprises: a selector switch, a first resistor, and a second resistor;

a first terminal of the first resistor is connected to a power supply, and a second terminal of the first resistor is sequentially connected to ground through the selector switch and the second resistor; or a first terminal of the selector switch is connected to the power supply, and a second terminal of the selector switch is sequentially connected to the ground through the first resistor and the second resistor; and a terminal of the second resistor close to the first resistor is configured to be connected to the PCIe device to provide the mode selection signal.

18. A mode switching method, being implemented based on a mode switching circuit, wherein the mode switching circuit comprises:

a first switching circuit, a second switching circuit, a clock switching circuit, and a first bidirectional level shifter, wherein an input terminal of the first switching circuit is configured to be connected to a first reverse differential pin of a connector, a first output terminal of the first switching circuit is configured to be connected to a first reset in-place terminal of a peripheral component interconnect express (PCIe) device, and a second output terminal of the first switching circuit is connected to the clock switching circuit; the first switching circuit is configured to transmit at least one of a root complex (RC) reset signal or an RC in-place signal between the first reverse differential pin and the first reset in-place terminal, or send an endpoint (ED) differential clock signal transmitted by the first reverse differential pin to the clock switching circuit;

a first input terminal of the second switching circuit is configured to be connected to a second reset in-place terminal of the PCIe device, a second input terminal of the second switching circuit is connected to the clock switching circuit, and an output terminal of the second switching circuit is configured to be connected to a first front differential pin of the connector; the second switching circuit is configured to send an RC differential clock signal to the first front differential pin, or at least one of transmit an ED reset signal or an ED in-place signal between the first front differential pin and the second reset in-place terminal;

the clock switching circuit is configured to generate a reference clock signal sent to the PCIe device and the RC differential clock signal sent to the second switching circuit, or generate the reference clock signal sent to the PCIe device according to the ED differential clock signal; and a first set of level shifting channels of the first bidirectional level shifter is configured to transmit data between a second reverse differential pin of the connector and a first data terminal of the PCIe device, and a second set of level shifting channels of the first bidirectional level shifter is configured to transmit data between a second front differential pin of the connector and a second data terminal of the PCIe device; two sets of level shifting channels of the first bidirectional level shifter are capable of being configured to transmit an inter-integrated circuit (I2C) bus signal or to transmit at least one of a wake-up signal or an identification (ID) signal;

wherein the mode switching method comprises:

performing, in an RC interface mode, following steps:

controlling the first switching circuit to transmit the at least one of the RC reset signal or the RC in-place signal between the first reverse differential pin of the connector and the first reset in-place terminal of the PCIe device;

controlling the clock switching circuit to generate the reference clock signal sent to the PCIe device and the RC differential clock signal sent to the second switching circuit; and controlling the second switching circuit to send the RC differential clock signal to the first front differential pin of the connector; and controlling the first set of level shifting channels of the first bidirectional level shifter to transmit the I2C bus signal, and controlling the second set of level shifting channels of the first bidirectional level shifter to transmit the at least one of the wake-up signal or the ID signal; or performing, in an ED interface mode, following steps:

controlling the first switching circuit to send the ED differential clock signal transmitted by the first reverse differential pin of the connector to the clock switching circuit;

controlling the clock switching circuit to generate the reference clock signal sent to the PCIe device according to the ED differential clock signal; and controlling the second switching circuit to transmit the at least one of the ED reset signal or the ED in-place signal between the first front differential pin of the connector and the second reset in-place terminal of the PCIe device; and controlling the first set of level shifting channels of the first bidirectional level shifter to transmit the at least one of the wake-up signal or the ID signal, and controlling the second set of level shifting channels of the first bidirectional level shifter to transmit the I2C bus signal.

19. A peripheral component interconnect express (PCIe) card, comprising: a PCIe device and at least one expansion connector comprising a connector and a mode switching circuit, wherein the mode switching circuit comprises:

a first switching circuit, a second switching circuit, a clock switching circuit, and a first bidirectional level shifter, wherein an input terminal of the first switching circuit is configured to be connected to a first reverse differential pin of the connector, a first output terminal of the first switching circuit is configured to be connected to a first reset in-place terminal of a peripheral component interconnect express (PCIe) device, and a second output terminal of the first switching circuit is connected to the clock switching circuit; the first switching circuit is configured to transmit at least one of a root complex (RC) reset signal or an RC in-place signal between the first reverse differential pin and the first reset in-place terminal, or send an endpoint (ED) differential clock signal transmitted by the first reverse differential pin to the clock switching circuit;

a first input terminal of the second switching circuit is configured to be connected to a second reset in-place terminal of the PCIe device, a second input terminal of the second switching circuit is connected to the clock switching circuit, and an output terminal of the second switching circuit is configured to be connected to a first front differential pin of the connector; the second switching circuit is configured to send an RC differential clock signal to the first front differential pin, or at least one of transmit an ED reset signal or an ED in-place signal between the first front differential pin and the second reset in-place terminal;

the clock switching circuit is configured to generate a reference clock signal sent to the PCIe device and the RC differential clock signal sent to the second switching circuit, or generate the reference clock signal sent to the PCIe device according to the ED differential clock signal; and a first set of level shifting channels of the first bidirectional level shifter is configured to transmit data between a second reverse differential pin of the connector and a first data terminal of the PCIe device, and a second set of level shifting channels of the first bidirectional level shifter is configured to transmit data between a second front differential pin of the connector and a second data terminal of the PCIe device; two sets of level shifting channels of the first bidirectional level shifter are capable of being configured to transmit an inter-integrated circuit (I2C) bus signal or to transmit at least one of a wake-up signal or an identification (ID) signal;

wherein the PCIe device is provided with RC firmware and ED firmware;

the PCIe device loads the RC firmware in an RC interface mode; or the PCIe device loads the ED firmware in an ED interface mode.

20. The PCIe card according to claim 19, wherein the at least one expansion connector comprises a mode selection circuit, and the PCIe device is configured to:

load the RC firmware in response to an RC mode instruction triggered based on the mode selection circuit; or load the ED firmware in response to an ED mode instruction triggered based on the mode selection circuit.

* * * * *